US012064692B2

(12) United States Patent
Liu et al.

(10) Patent No.: US 12,064,692 B2
(45) Date of Patent: Aug. 20, 2024

(54) METHOD AND APPARATUS FOR DISPLAYING GAME SKILL COOLDOWN PROMPT IN VIRTUAL SCENE

(71) Applicant: TENCENT TECHNOLOGY (SHENZHEN) COMPANY LIMITED, Shenzhen (CN)

(72) Inventors: Peicheng Liu, Shenzhen (CN); Xiaohao Liu, Shenzhen (CN); Shan Lin, Shenzhen (CN); Kai Tang, Shenzhen (CN); Bo Ye, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 190 days.

(21) Appl. No.: 17/742,344

(22) Filed: May 11, 2022

(65) Prior Publication Data
US 2022/0266139 A1 Aug. 25, 2022

Related U.S. Application Data

(63) Continuation of application No. PCT/CN2021/126410, filed on Oct. 26, 2021.

(30) Foreign Application Priority Data

Nov. 20, 2020 (CN) .......................... 202011309963.1

(51) Int. Cl.
A63F 13/537 (2014.01)
A63F 13/52 (2014.01)
(Continued)

(52) U.S. Cl.
CPC ............ *A63F 13/537* (2014.09); *A63F 13/52* (2014.09); *A63F 13/2145* (2014.09); *A63F 13/58* (2014.09)

(58) Field of Classification Search
None
See application file for complete search history.

(56) References Cited

U.S. PATENT DOCUMENTS

2021/0331070 A1   10/2021   Song

FOREIGN PATENT DOCUMENTS

CN   107362534 A   11/2017
CN   108804013 A   11/2018
(Continued)

OTHER PUBLICATIONS

CN Pub. 110772800 English translation via Google Patents, Feb. 11, 2020 (Year: 2020).*

(Continued)

*Primary Examiner* — Damon J Pierce
(74) *Attorney, Agent, or Firm* — ANOVA LAW GROUP PLLC

(57) ABSTRACT

This application provides an information processing method and apparatus in a virtual scene, a device, a computer-readable storage medium, and a computer program product. The method includes displaying a skill control of a target skill corresponding to a virtual object controlled by the electronic device in a display interface of a virtual scene; when the skill control is in a cooldown state, receiving a transmission instruction of skill cooldown prompt information triggered from the skill control, the transmission instruction being associated with a target virtual object in the virtual scene; transmitting the skill cooldown prompt information of the skill control to the target virtual object in the virtual scene in response to the transmission instruction; and displaying the skill cooldown prompt information prompting a cooldown time of the skill control.

16 Claims, 16 Drawing Sheets

(51) Int. Cl.
  *A63F 13/2145* (2014.01)
  *A63F 13/58* (2014.01)

(56) References Cited

FOREIGN PATENT DOCUMENTS

| CN | 109865286 A | 6/2019 |
| CN | 110368691 A | 10/2019 |
| CN | 110772800 A | 2/2020 |
| CN | 112402963 A | 2/2021 |
| KR | 20150016660 A | 2/2015 |

OTHER PUBLICATIONS

CN Pub. 108804013 English translation via Google Patents, Nov. 13, 2018 (Year: 2018).*
China National Intellectual Property Administration (CNIPA) Office Action 1 for 202011309963.1 Jan. 6, 2022 9 Pages (including translation).
The World Intellectual Property Organization (WIPO) International Search Report for PCT/CN2021/126410 Jan. 19, 2022 8 Pages (including translation).

* cited by examiner

METHOD AND APPARATUS FOR
DISPLAYING GAME SKILL COOLDOWN
PROMPT IN VIRTUAL SCENE

RELATED APPLICATIONS

This application claims priority of PCT Application No. PCT/CN2021/126410, filed on Oct. 26, 2021, which claims priority to Chinese Patent Application No. 202011309963.1 filed on Nov. 20, 2020. The two applications are both incorporated herein by reference in their entirety.

FIELD OF THE TECHNOLOGY

This application relates to the technologies of human-computer interaction of computers, and in particular, to an information processing method and apparatus in a virtual scene, a device, a computer-readable storage medium, and a computer program product.

BACKGROUND OF THE DISCLOSURE

In many virtual scenes, to better exhibit the characteristics of virtual objects in a combat team, different virtual objects often have different skills, different skills correspond to different cooldown time intervals. The transmission of skill cooldown prompt information to inform other teammates in the team is vital to the combat ability of the entire team.

SUMMARY

Embodiments of this application provide an information processing method and apparatus in a virtual scene, a device, a computer-readable storage medium, and a computer program product, so that the transmission of skill cooldown prompt information can be implemented without operating a non-skill control but only based on a trigger operation of a skill control itself, thereby simplifying operations and improving the display simplicity of an interface, to save display resources.

One aspect of this application provides an information processing method in a virtual scene. The method includes The method includes displaying a skill control of a target skill corresponding to a virtual object controlled by the electronic device in a display interface of a virtual scene; when the skill control is in a cooldown state, receiving a transmission instruction of skill cooldown prompt information triggered from the skill control, the transmission instruction being associated with a target virtual object in the virtual scene; transmitting the skill cooldown prompt information of the skill control to the target virtual object in the virtual scene in response to the transmission instruction; and displaying the skill cooldown prompt information prompting a cooldown time of the skill control.

Another aspect of this application provides an information processing apparatus in a virtual scene. The apparatus includes a first display module, configured to display a skill control of a target skill corresponding to a virtual object controlled by the electronic device in a display interface of a virtual scene; when the skill control is in a cooldown state, receive a transmission instruction of skill cooldown prompt information triggered from the skill control, the transmission instruction being associated with a target virtual object in the virtual scene; transmit the skill cooldown prompt information of the skill control to the target virtual object in the virtual scene in response to the transmission instruction; and display the skill cooldown prompt information prompting a cooldown time of the skill control.

The embodiments of this application provide a non-transitory computer-readable storage medium, storing executable instructions, implementing, when being executed by a processor, the information processing method in a virtual scene provided in the embodiments of this application.

In the embodiments of this application, a skill control of a target skill is displayed in a display interface of a virtual scene; and when the skill control is in a cooldown state, a transmission instruction of skill cooldown prompt information triggered from the skill control is received, the skill cooldown prompt information of the skill control is transmitted to at least one target virtual object in the virtual scene in response to the transmission instruction, and the skill cooldown prompt information is displayed, the skill cooldown prompt information being used for prompting a cooldown time of the skill control. As such, the transmission of skill cooldown prompt information can be implemented without operating a non-skill control but only based on a trigger operation of a skill control itself, to avoid invoking the non-skill control to transmit the skill cooldown prompt information every time, thereby making game operations less complex. In addition, it is not necessary to add an additional non-skill control in a display interface of a virtual scene, thereby improving the display simplicity of an interface, and saving display resources.

DESCRIPTION OF EMBODIMENTS

Figure 1:
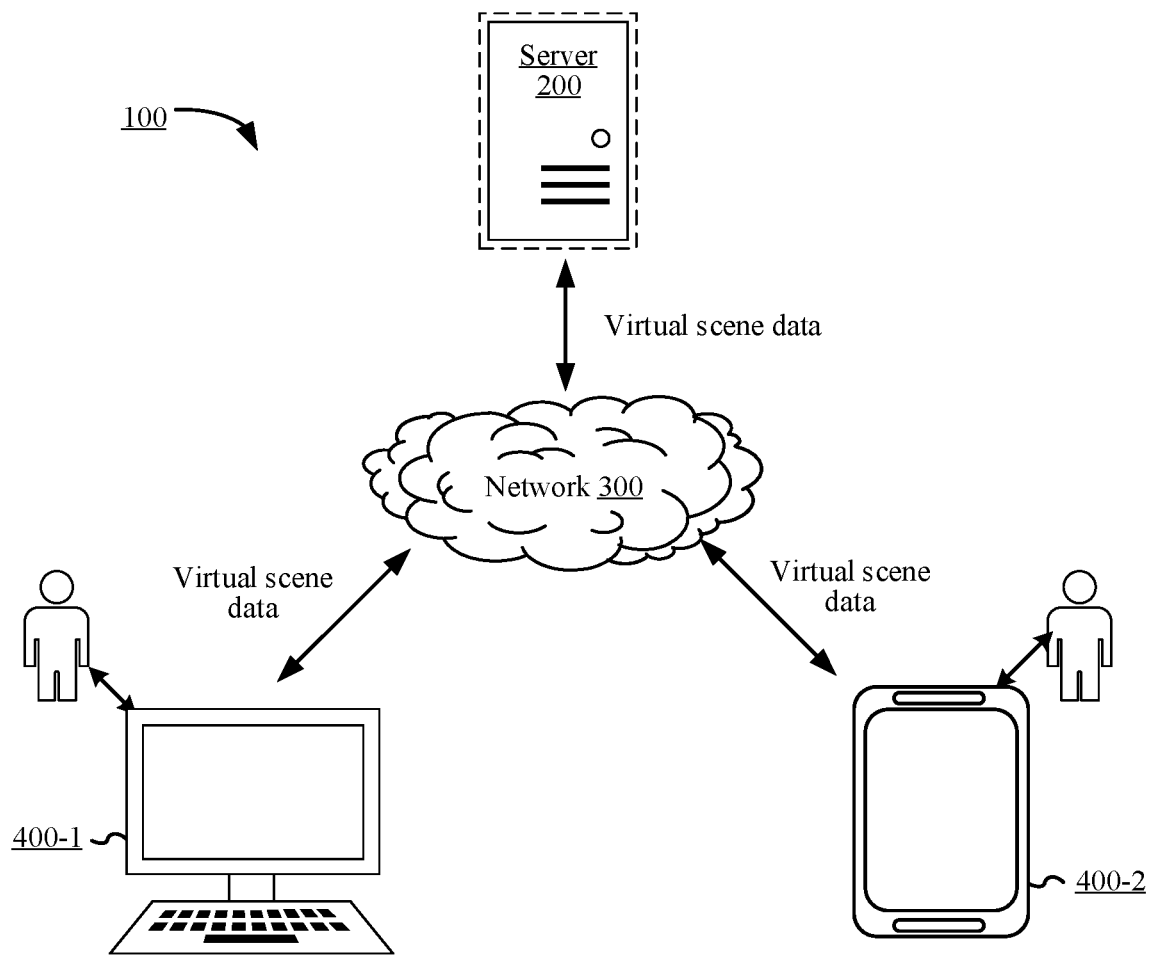
FIG. 1 is a schematic architectural diagram of an information processing system in a virtual scene according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict.

In the following descriptions, the included term "first/second . . . " is merely intended to distinguish similar objects but does not necessarily indicate a specific order of an object. It may be understood that "first/second . . . " is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

1) A client is an application that is run on a terminal and is configured to provide various services, for example, a video playback client or a game client.

2). The expression "in response to" is used for indicating a condition or a status on which a to-be-performed operation is dependent. When the condition or the status is satisfied, one or more to-be-performed operations may be performed in real time or after a set delay. Unless otherwise specified, there is no chronological order between the plurality of to-be-performed operations.

3) A virtual scene is displayed (or provided) when the application is run on the terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, and a three-dimensional virtual scene. The dimensionality of the virtual scene is not limited in the embodiments of this application. For example, the virtual scene may include the sky, the land, the ocean, or the like. The land may include environmental elements such as the desert and a city. The user may control the virtual object to move in the virtual scene.

4) A virtual object is an image of any one of various interactable characters or objects in the virtual scene or a movable object in the virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing the user in the virtual scene. The virtual scene may include a plurality of virtual objects, and each virtual object has a shape and a volume in the virtual scene, and occupies some space in the virtual scene.

In some embodiments, the virtual object may be a user role controlled through operations on the client, or may be Artificial Intelligence (AI) set through training in a combat in the virtual scene, or may be a non-player character (NPC) set in interactions in the virtual scene. In some embodiments, the virtual object may be a virtual character performing adversarial interactions in the virtual scene. In some embodiments, a quantity of virtual objects that participate in interactions in the virtual scene may be preset or may be dynamically determined according to a quantity of clients that join interactions.

5) Scene data represents various features shown by an object in the virtual scene during interactions, and for example, may include a position of the object in the virtual scene. Certainly, different types of features may be included according to types of virtual scenes. For example, in a virtual scene of a game, scene data may include a wait time required for various functions configured in the virtual scene (depending on a quantity of times that one same function can be used within a particular time) or may represent attribute values of various states of a game role, including, for example, health points (also referred to as red) and magic points (also referred to as blue).

6) A cooldown time is set to restrict a quantity of times that a user uses a skill within a period of time in an application of a virtual scene, that is, a time interval between a moment at which a virtual object in the virtual scene uses a skill once and a moment at which the virtual object can use the skill a next time. For example, the virtual object uses a skill A (the skill A has a cooldown time of 30 seconds). After the skill A is used, the skill A remains in a cooldown state within the next 30 seconds, and the skill A cannot be used within this period.

In many game applications, the function of transmitting skill cooldown prompt information is bound to a non-skill control (for example, a chat control) in a virtual scene, and the transmission of skill cooldown prompt information is implemented by operating the non-skill control. However, the native function of the non-skill control is not associated with the transmission of skill cooldown prompt information. After the function of transmitting skill cooldown prompt information is bound to the non-skill control, the non-skill control then needs to be invoked to transmit skill cooldown prompt information every time, leading to complex and restricted operations. In some applications, the non-skill control resides in a display interface of the virtual scene, making it more complex to display the interface.

FIG. 1 is a schematic architectural diagram of an information processing system 100 in a virtual scene according to an embodiment of this application. To support an application, terminals (for example, a terminal 400-1 and a terminal 400-2) are connected to a server 200 by a network 300. The network 300 may be a wide area network, a local area network, or a combination of thereof. Data transmission is implemented by using a wireless or a wired link.

The terminal may be a smartphone, a tablet computer, a notebook computer, or any other of various types of user terminals, or may be a desktop computer, a game console, a television, an in-vehicle terminal or a combination of any two or more of these data processing devices. The server 200 may be a separately configured server that supports various services or may be configured as a server cluster or may be a cloud server or the like.

In one embodiment, an application supporting a virtual scene is installed and run on the terminal. The application may be any one of a first-person shooting game (FPS), a multiplayer online battle arena game (MOBA), a massive multiplayer online (MMO) game, a two-dimensional (2D) game application, a three-dimensional (3D) game application, a virtual reality application, a 3D map program, a military simulation program, and a multi-player shootout survival game. The application may be a standalone application such as a standalone 3D game application. A user may use the terminal to control a virtual object to perform an activity in the virtual scene. The activity includes, but is not limited to, at least one of adjusting body postures, crawling, running, riding, jumping, driving, picking, shooting, attacking, throwing, and stabbing. For example, the virtual character is a virtual person, such as a simulated person role or a cartoon person role.

An electronic game scene is used as an example. The user may perform an operation on a terminal in advance, and a game configuration file of an electronic game may be downloaded after the terminal detects the operation of the user. The game configuration file may include an application, interface display data, virtual scenario data, or the like of the electronic game, so that the user may invoke the game configuration file when logging into the electronic game on the terminal, so as to render and display an electronic game interface. The user may perform a touch operation on the terminal, and after detecting the touch operation, the terminal may determine game data corresponding to the touch operation and render and display the game data. The game data may include virtual scene data, behavioral data of a virtual object in the virtual scene, and the like.

In one embodiment, when entering a virtual scene, the terminal transmits a request of obtaining scene data of the virtual scene to the server 200. The server obtains and returns the scene data of the virtual scene to the terminal based on the received request of obtaining the scene data. The terminal receives the scene data of the virtual scene, renders a display interface of the virtual scene based on the scene data, and displays a skill control of a target skill in the display interface of the virtual scene. When the skill control is in a cooldown state, in response to a transmission instruction of skill cooldown prompt information triggered based on the skill control, the terminal transmits the skill cooldown prompt information of the skill control to at least one target virtual object in the virtual scene, and displays the skill cooldown prompt information in a prompt area in the display interface of the virtual scene, the skill cooldown prompt information being used for prompting a cooldown time of the skill control.

A military virtual simulation application is used as an example. A virtual scene technology is used to allow a trainee to actually experience a battlefield environment visually and auditorily, learn about environmental features of a combat area, and use necessary equipment to interact with an object in a virtual scene. In a method for implementing a virtual battlefield environment, a corresponding 3D battlefield environment graphics and image library may be used, including a combat background, a battleground scene, various weapon equipment, combat personnel, and the like. A highly dangerous and nearly realistic 3D battlefield environment is created through background generation and image synthesis.

In some embodiments, when entering a virtual scene, the terminal transmits a request of obtaining scene data of the virtual scene to the server 200. The server obtains and returns the scene data of the virtual scene to the terminal based on the received request of obtaining the scene data. The terminal receives the scene data of the virtual scene, renders a display interface of the virtual scene based on the scene data, and displays a skill control of a target skill in the display interface of the virtual scene. When the skill control is in a cooldown state, in response to a transmission instruction of skill cooldown prompt information triggered based on the skill control, the terminal transmits the skill cooldown prompt information of the skill control to at least one target virtual object in the virtual scene and/or to the electronic device associated with the target virtual object, and displays the skill cooldown prompt information in a prompt area in the display interface of the virtual scene, the skill cooldown prompt information being used for prompting a cooldown time of the skill control.

Figure 2:
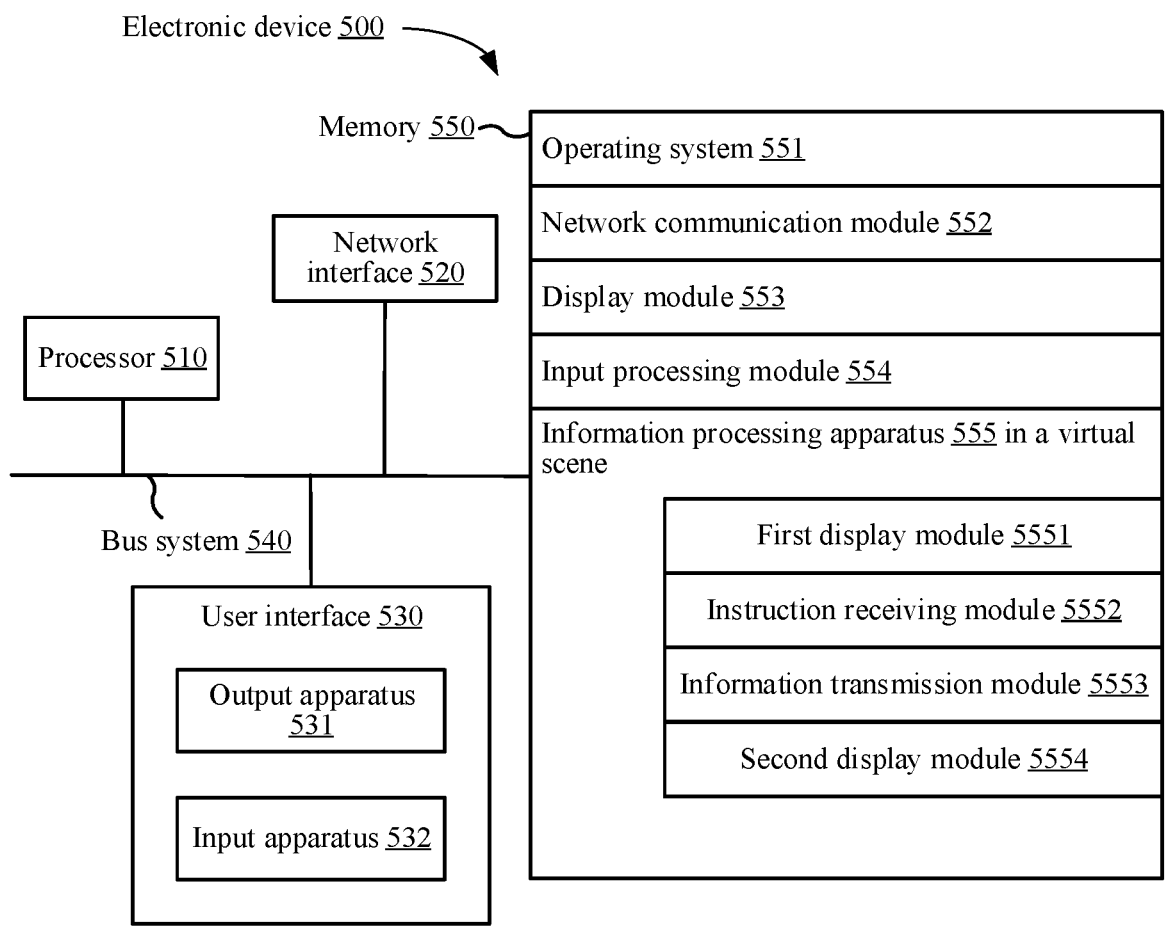
FIG. 2 is a schematic structural diagram of an electronic device according to an embodiment of this application.

FIG. 2 is a schematic structural diagram of an electronic device 500 according to an embodiment of this application. In one embodiment, the electronic device 500 may be the terminal 400-1, the terminal 400-2 or the server 200 in FIG. 1. An example in which the electronic device is the terminal 400-1 or the terminal 400-2 shown in FIG. 1 is used to describe a computer device implementing the information processing method in a virtual scene in the embodiments of this application. The electronic device 500 shown in FIG. 2 includes at least one processor 510, a memory 550, at least one network interface 520, and a user interface 530. All the components in the electronic device 500 are coupled together by using a bus system 540. It may be understood that the bus system 540 is configured to implement connection and communication between these assemblies. In addition to a data bus, the bus system 540 further includes a power bus, a control bus, and a status signal bus. However, for ease of clear description, all types of buses are marked as the bus system 540 in FIG. 2.

The processor 510 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 530 includes one or more output apparatuses 531 that can display media content, including one or more speakers and/or one or more visual display screens. The user interface 530 further includes one or more input apparatuses 532, including user interface components that facilitate inputting of a user, such as a keyboard, a mouse, a microphone, a touch display screen, a camera, and other input buttons and controls.

The memory 550 may be a removable memory, a non-removable memory, or a combination thereof. Hardware devices include a solid-state memory, a hard disk drive, an optical disc driver, or the like. The memory 550 optionally includes one or more storage devices that are physically away from the processor 510.

The memory 550 includes a volatile memory or a non-volatile memory, or may include a volatile memory and a non-volatile memory. The non-volatile memory may be a read-only memory (ROM), and the volatile memory may be a random access memory (RAM). The memory 550 described in this embodiment of this application is to include any other suitable type of memories.

In some embodiments, the memory 550 may store data to support various operations. Examples of the data include programs, modules, and data structures, or a subset or a superset thereof, which are illustrated below.

An operating system 551 includes a system program configured to process various basic system services and perform a hardware-related task, for example, a framework layer, a core library layer, and a driver layer, and is configured to implement various basic services and process a hardware-related task.

A network communication module 552 is configured to reach another computing device through one or more (wired or wireless) network interfaces 520. Network interfaces 520 include: Bluetooth, Wireless Fidelity (Wi-Fi), a universal serial bus (USB), and the like.

A display module 553 is configured to display information by using an output apparatus 531 (for example, a display screen or a speaker) associated with one or more user interfaces 530 (for example, a user interface configured to operate a peripheral device and display content and information).

An input processing module 554 is configured to detect one or more user inputs or interactions from one of the one or more input apparatuses 532 and translate the detected input or interaction.

In some embodiments, the information processing apparatus in a virtual scene provided in this embodiment of this application may be implemented by using software. FIG. 2 shows an information processing apparatus 555 in a virtual scene stored in the memory 550. The apparatus may be software in a form such as a program and a plug-in, and includes the following software modules: a first display module 5551, an information transmission module 5552, and a second display module 5553. These modules are logical modules, and may be randomly combined or further divided based on a function to be performed. The following describes a function of each module.

In some other embodiments, the apparatus provided in the embodiments of this application may be implemented by using hardware. For example, the apparatus provided in this embodiment of this application may be a processor in a form of a hardware decoding processor, programmed to perform the information processing method in a virtual scene provided in the embodiments of this application. For example, the processor in the form of a hardware decoding processor may use one or more application-specific integrated circuits (ASIC), a DSP, a PLD, a complex programmable logic device (CPLD), a field-programmable gate array (FPGA), or other electronic components.

Figure 3:
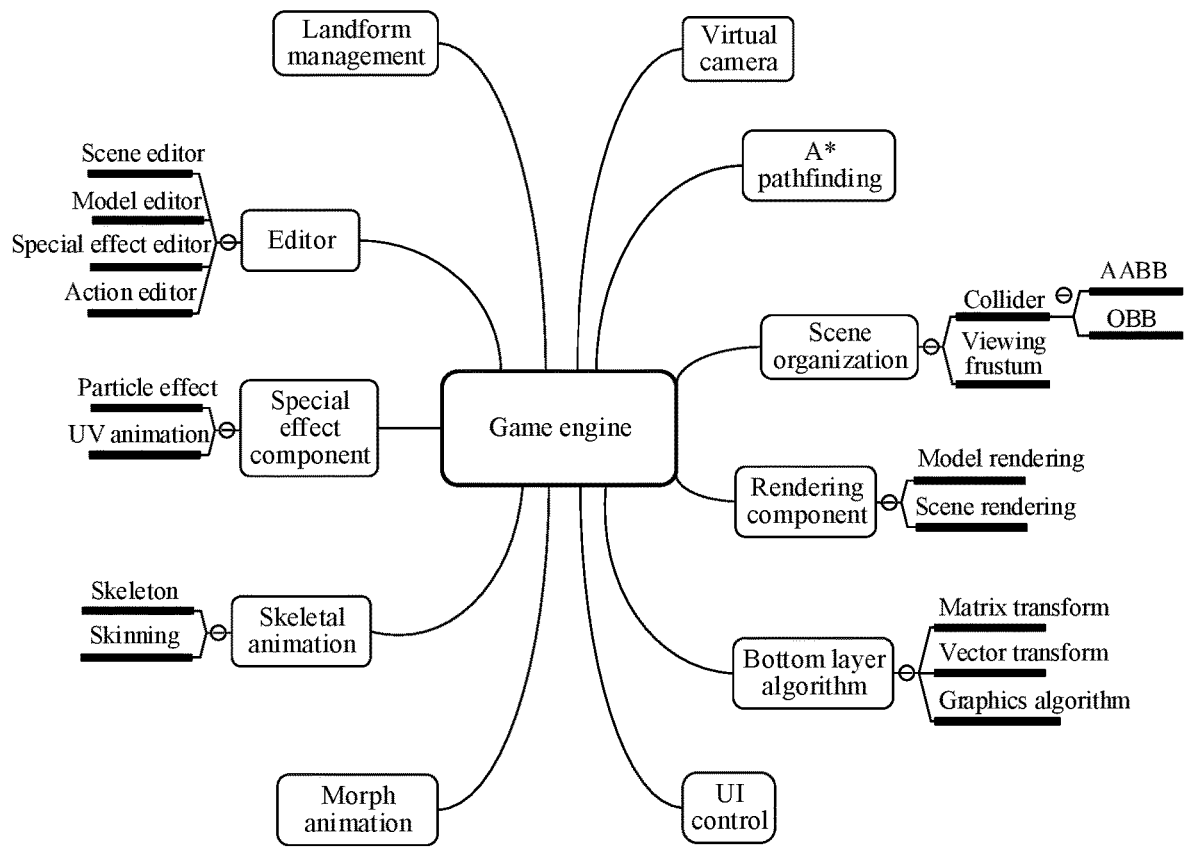
FIG. 3 is a schematic diagram of the principle of a human-computer interaction engine installed in an information processing apparatus in a virtual scene according to an embodiment of this application.

In some embodiments, a human-computer interaction engine configured to implement the information processing method in a virtual scene is installed on the information processing apparatus 555 in a virtual scene. The human-computer interaction engine includes functional modules, components or plug-ins configured to implement the information processing method in a virtual scene. FIG. 3 is a schematic diagram of the principle of a human-computer interaction engine installed in an information processing apparatus in a virtual scene according to an embodiment of this application. Referring to FIG. 3, for example, the virtual scene is a game scene, and correspondingly, the human-computer interaction engine is a game engine.

The game engine is a set of code or instructions that are designed for an electronic device running a type of games and can be recognized by the electronic device, and is configured to control the running of the games. One game application may include a game engine and game resources. That is, a game includes a game engine (program code) and game resources (images, sounds, animations, and the like). The game resources include images, sounds, animations, and the like, and the game engine sequentially invokes these resources according to requirements in game design.

The information processing method in a virtual scene provided in the embodiments of this application may be implemented by various modules in the information processing apparatus in a virtual scene shown in FIG. 2 by invoking related modules, components or plug-ins of the game engine shown in FIG. 3. The modules, components or plug-ins included in the game engine shown in FIG. 3 are described below.

1) A virtual camera is a necessary component for a game scene screen and is configured to display the game scene screen. One game scene at least corresponds to one virtual camera. In some embodiments, there may be two or more virtual cameras. As a window for game rendering, the virtual camera captures and displays screen content of a game world for a player. A perspective such as a first person perspective or a third person perspective from which the player views the game world may be adjusted by setting parameters of the virtual camera.

2) Scene organization is used for game scene management such as collision detection and visibility culling. The collision detection may be implemented by using a collider. In some embodiments, the collider may be implemented by using an axis-aligned bounding box (AABB) or implemented by using an oriented bounding box (OBB). The visibility culling may be implemented based on a viewing frustum. The viewing frustum is a 3D frame generated according to a virtual camera and is used for cutting an object outside a visible range of the camera. An object in the viewing frustum is projected onto a view plane, and an object that is not in the viewing frustum is discarded without processing.

3) Landform management is a component for landform management in a game scene and is configured to create and edit a game landform, for example, a landform in a game scene such as a mountain range, a canyon, and a cave.

4) Editors are auxiliary tools in game design, and include:
a scene editor, configured to edit game scene content, for example, change a landform, customize vegetation distribution, and customize a lighting layout;
a model editor, configured to make and edit a model (a character model in a game scene) in a game;
a special effect editor, configured to edit a special effect in a game screen; and
an action editor, configured to define and edit an action of a character in a game screen.

5) A special effect component is configured to make and edit a game special effect in a game screen. In one embodiment, the special effect component may be implemented by using a particle effect and a texture UV animation. The particle effect is to combine numerous individual particles to present a fixed form, and a controller or a script is used to generally or individually control the particles to move to simulate effects such as water, fire, fog, and gas in reality. The UV animation is a texture animation implemented by using dynamically changing UV coordinates of a map.

6) A skeletal animation is an animation implemented by using a built-in skeleton to drive an object to move. The skeletal animation may be understood as the following two concepts:

A skeleton is an abstract concept used for controlling a skin. For example, a human skeleton is used to control a skin.

A skin is a factor that is controlled by a skeleton and is displayed outside. For example, the skin of a human body is affected by a skeleton.

7) Morph animation is an animation implemented by adjusting vertices of a basic model.

8) A UI control is a control configured to implement display of a game screen.

9) A bottom layer algorithm is an algorithm that needs to be invoked to implement functions in a game engine, for example, a graphics algorithm required to implement scene organization, or matrix transform and vector transform required for implementing a skeletal animation.

10) A rendering component is a necessary component for displaying a game screen effect. The rendering component is used to implement switching from a scene described with 3D vectors to a scene described with 2D pixels, and includes model rendering and scene rendering.

11) A* pathfinding is an algorithm for finding the shortest path used during path planning, pathfinding, and graph traversal in game design.

Next, the information processing method in a virtual scene provided in the embodiments of this application is described. In some embodiments, the information processing method in a virtual scene provided in the embodiments of this application may be separately implemented by a server or a terminal or may be implemented by a server and a terminal in cooperation.

Figure 4:
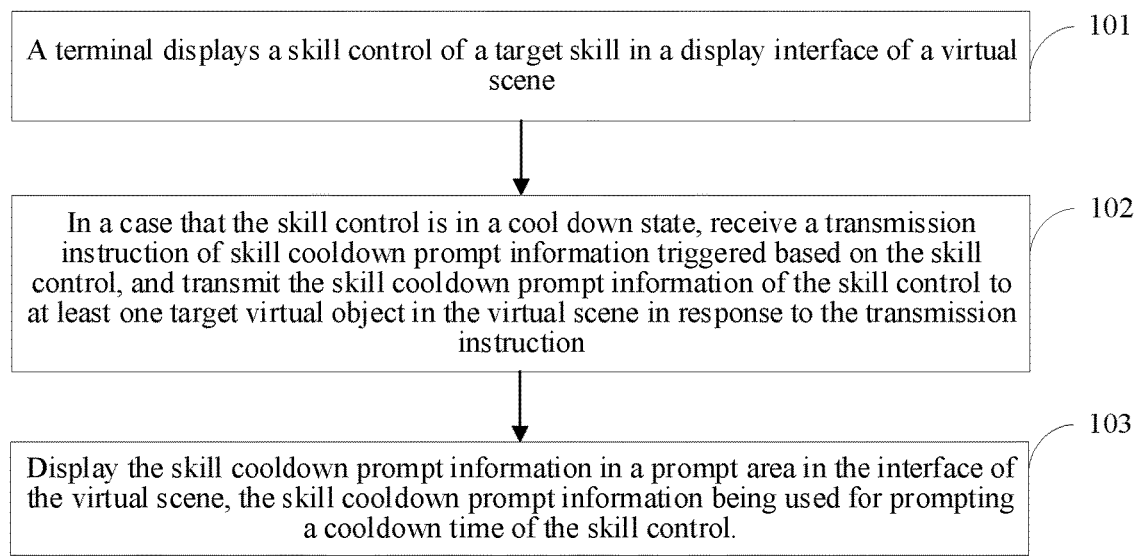
FIG. 4 is a schematic flowchart of an information processing method in a virtual scene according to an embodiment of this application.

FIG. 4 is a schematic flowchart of an information processing method in a virtual scene according to an embodiment of this application. The steps shown in FIG. 4 are described.

Step 101: A terminal displays a skill control of a target skill in a display interface of a virtual scene.

In one embodiment, an application supporting a virtual scene is installed on the terminal. When a user opens the application on the terminal and the terminal runs the application, the terminal obtains scene data of a virtual scene, renders a display interface of the virtual scene based on the scene data of the virtual scene, and displays the rendered display interface of the virtual scene. The display interface of the virtual scene may be obtained by observing the virtual scene from a first person perspective or observing the virtual scene from a third person perspective. In addition to a skill control for displaying a target skill, an interaction object and an object interaction environment may be further displayed in the display interface of the virtual scene. For example, a virtual object and a target object in an adversarial relationship interact in the virtual scene.

Skill controls of a plurality of skills may be displayed in the display interface of the virtual scene. A skill control in a cooldown state cannot be used, and a skill control in a non-cooldown state can be cast and used. Generally, skill controls in different states are displayed in different display styles. For example, in the display interface of the virtual scene, a skill control in a cooldown state is displayed in gray, and a skill control in a non-cooldown state is highlighted. In another example, in the display interface of the virtual scene, a skill control in a cooldown state is displayed in a red display style, and a skill control in a non-cooldown state is displayed in a green display style. It is to be understood that other display styles may be used to distinguish between a skill control in a cooldown state and a skill control in a non-cooldown state. For example, skill controls in different states are displayed in different colors. Display styles of skill controls in different states are not limited in the embodiments of this application.

Figure 5:
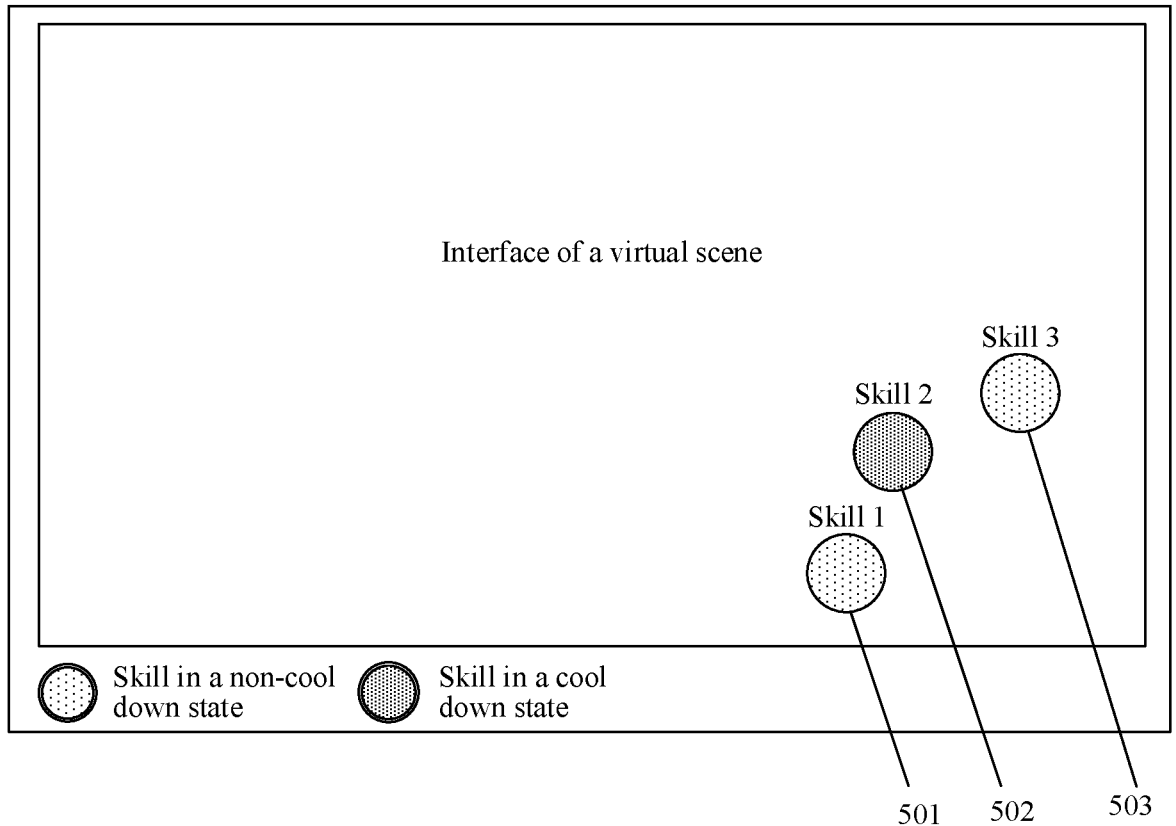
FIG. 5 is a schematic diagram of a group of display interfaces according to an embodiment of this application.

FIG. 5 is a schematic diagram of a group of display interfaces according to an embodiment of this application. Skill controls of a plurality of skills are displayed in the display interface of the virtual scene. Skill controls in different states are displayed in display styles. For example, a skill control 501 of a skill 1 and a skill control 503 of a skill 3 are in a non-cooldown state, and a skill control 502 of a skill 2 is in a cooldown state.

In some embodiments, the terminal may use the following method to determine whether a skill control is in a cooldown state: obtaining a current moment of the virtual scene, a cast moment corresponding to completion of a last cast of the target skill, and a total cooldown time corresponding to one cooldown cycle of the skill control; obtaining a time interval between the current moment and the cast moment, and when the time interval is less than the total cooldown time, determining that the skill control is in a cooldown state; and when the time interval is greater than the total cooldown time, determining that the skill control is in a non-cooldown state.

The terminal detects in real time whether a skill control is in a cooldown state. During real-time detection, a time interval obtained in real time between a current moment and a cast moment corresponding to completion of a last cast of a target skill is compared with a total cooldown time required for the cooldown of the skill control to complete to determine a real-time state of the skill control, and a display style corresponding to the real-time state is used to display the skill control. For example, when the time interval does not reach the total cooldown time, it is determined that the skill control is still in a cooldown state. When the time interval reaches the total cooldown time, it is determined that the cooldown of the skill control completed, and the skill control changes from a cooldown state to a non-cooldown state.

In some embodiments, the terminal may use the following method to determine whether a skill control is in a cooldown state: in response to a trigger operation for the skill control, obtaining a trigger moment corresponding to the trigger operation, a cast moment corresponding to completion of a last cast of the target skill, and a total cooldown time corresponding to one cooldown cycle of the skill control; obtaining a time interval between the trigger moment and the cast moment, and when the time interval is less than the total cooldown time, determining that the skill control is in a cooldown state; and when the time interval is greater than the total cooldown time, determining that the skill control is in a non-cooldown state.

It is only when receiving a trigger operation for the skill control that the terminal detects whether the skill control is in a cooldown state. A time interval between a trigger moment and a cast moment corresponding to completion of a last cast of a target skill is compared with a total cooldown time required for the cooldown of the skill control to complete to determine a state that the skill control is in, and a corresponding operation is performed based on the state that the skill control is in. The trigger operation for the skill control may be a click operation or may be an operation such as a long press, a double click or a swipe. The trigger operation is not limited in the embodiments of this application.

In some embodiments, when it is determined that the skill control is not in a cooldown state, a skill cast indication icon is displayed. The skill cast indication icon is used for indicating a swipe direction of a swipe from the skill control. A swipe operation starting from a skill icon and swiping in the swipe direction indicated by the skill cast indication icon is received. When the swipe operation is released, the target skill is cast in the swipe direction of the swipe operation.

Figure 6:
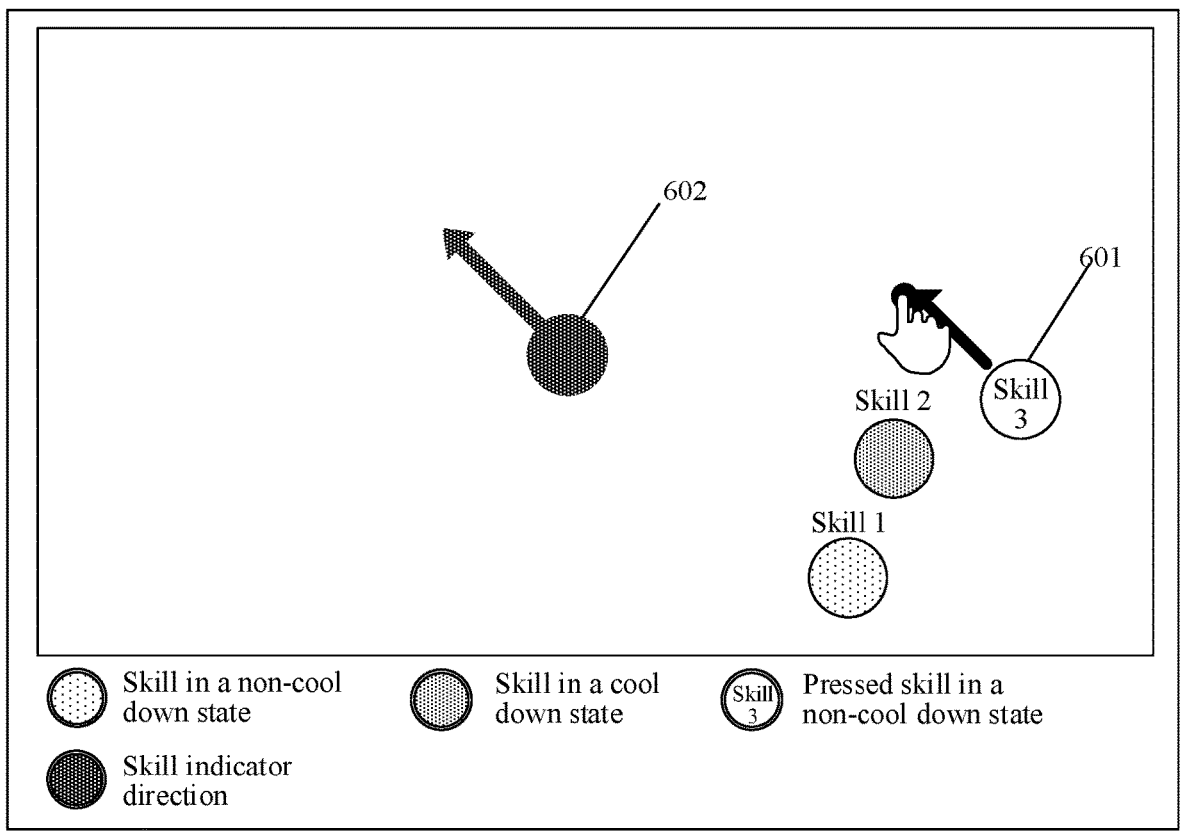
FIG. 6 is a schematic diagram of the display of a skill cast interface according to an embodiment of this application.

FIG. 6 is a schematic diagram of the display of a skill cast interface according to an embodiment of this application. When a user triggers a skill control 601 of a skill 3, in response to a trigger operation, a terminal determines whether the skill control 601 is in a cooldown state. When it is determined that the skill control 601 is in a cooldown state, a skill cast indication icon 602 is displayed to indicate a swipe direction swiping from the position of the skill control 601. When the user swipes a finger starting from the position of the skill control 601 according to the swipe direction indicated by the skill cast indication icon 602 and releases the finger after the finger swipes to a target position (that is, releases a swipe operation), the skill 3 is cast according to the swipe direction of the finger.

Step 102: When the skill control is in a cooldown state, receive a transmission instruction of skill cooldown prompt information triggered based on the skill control, and transmit the skill cooldown prompt information of the skill control to at least one target virtual object in the virtual scene in response to the transmission instruction.

In one embodiment, a style of a cooldown progress bar or a countdown in an area associated with a skill control may be used to represent whether the skill control is currently in a cooldown state. For example, when the cooldown progress bar shows that the cooldown progress is 50%, it represents that the skill control is in the middle of cooldown and is in a cooldown state. When the cooldown progress bar shows that the cooldown progress is 100%, it represents that the cooldown of the skill control is completed, and the skill control is in a non-cooldown state.

In some embodiments, the terminal may receive the transmission instruction of the skill cooldown prompt information in the following manner:

in response to a trigger operation for the skill control, displaying a target area for triggering transmission of the skill cooldown prompt information; and in response to a swipe operation triggered based on the skill control, when a swipe ending position of the swipe operation is in the target area, receiving the transmission instruction of the skill cooldown prompt information.

When the user triggers a skill control in a cooldown state, in response to the trigger operation, the terminal displays a target area for transmitting the skill cooldown prompt information. The target area is an area used for triggering transmission of the skill cooldown prompt information. When the user swipes a finger starting from the position of a skill control in any swipe direction or along any swipe path and releases the finger (that is, releases a swipe operation) after the finger swipes to the target area, the terminal receives the transmission instruction of the skill cooldown prompt information to transmit the skill cooldown prompt information of the skill control to the target virtual object and/or to the electronic device associated with the target virtual object; or otherwise, the terminal does not perform a transmission operation.

Figure 7:
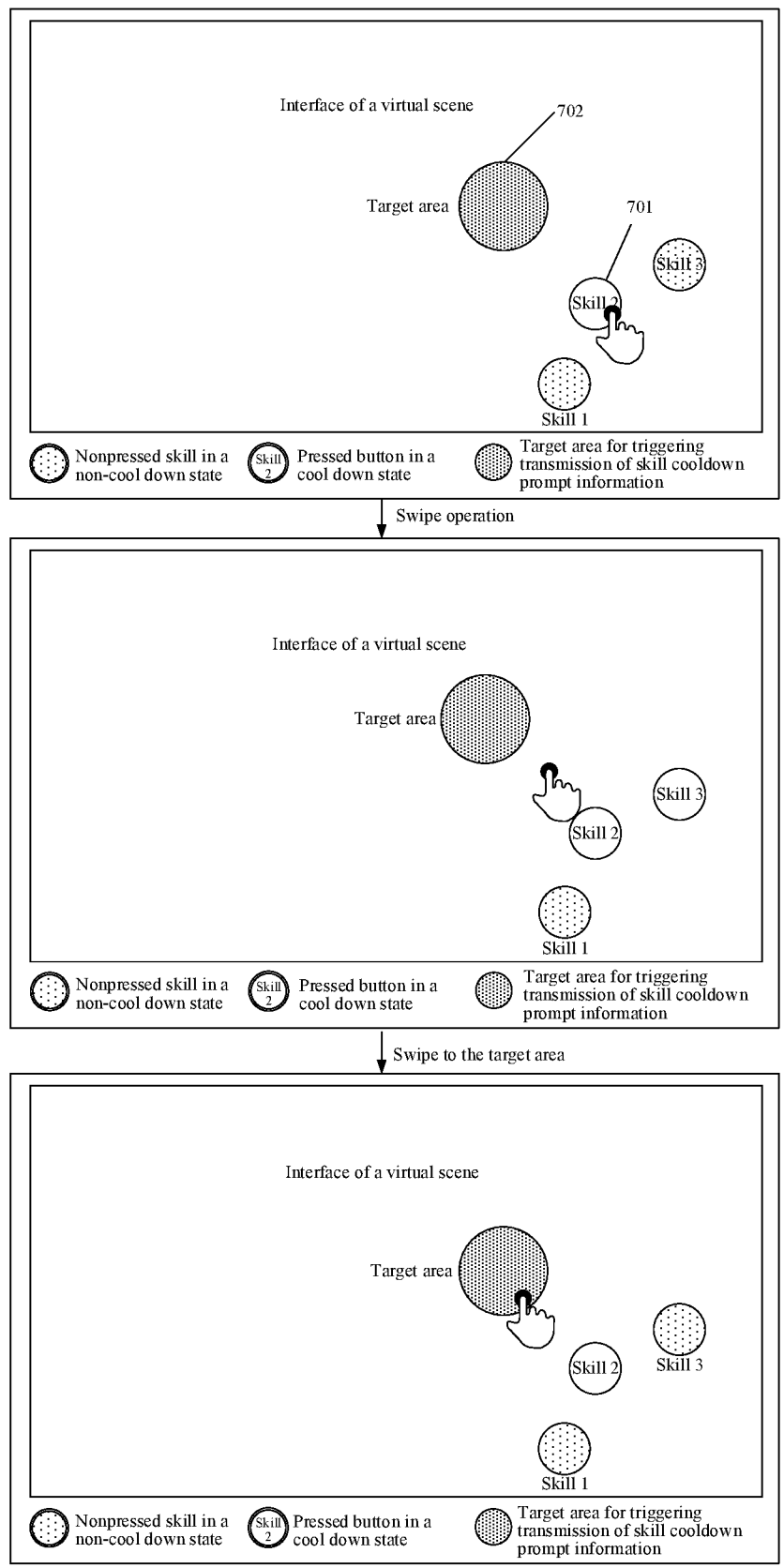
FIG. 7 is a schematic diagram of the display of a swipe operation according to an embodiment of this application.

FIG. 7 is a schematic diagram of the display of a swipe operation according to an embodiment of this application. When the user triggers a skill control 701 of a skill 2, a target area 702 used for triggering transmission of skill cooldown prompt information is displayed in the display interface of the virtual scene. When the user swipes a finger starting from the position of the skill control 701 and releases the finger after the finger swipes to the target area 702, the terminal receives the swipe operation, and receives the transmission instruction of the skill cooldown prompt information in response to the swipe operation. Accordingly, a displayed target area can provide a notable prompt to a player for the player to quickly trigger a swipe operation to the target area from the position of a skill control, thereby improving the efficiency of transmitting skill cooldown prompt information.

In some embodiments, tip information that can trigger transmission of skill cooldown prompt information may be displayed in the target area, for the user to determine, based on the tip information, whether to swipe a skill control. The trigger operation for the skill control and the swipe operation triggered based on the skill control may be discontinuous operations or continuous operations. In the case of discontinuous operations, the trigger operation for the skill control may be a click operation or may be an operation such as a long press, a double click or a swipe. When the user releases the trigger operation, the target area remains displayed in the display interface of the virtual scene. In the case of continuous operations, the trigger operation for the skill control is a start operation of the swipe operation triggered based on the skill control. A swipe trajectory of the swipe operation triggered based on the skill control may be a target trajectory or may be any trajectory. That is, any swipe operation starting from a skill control and ending in a target area can trigger the transmission instruction of the skill cooldown prompt information.

Figure 8:
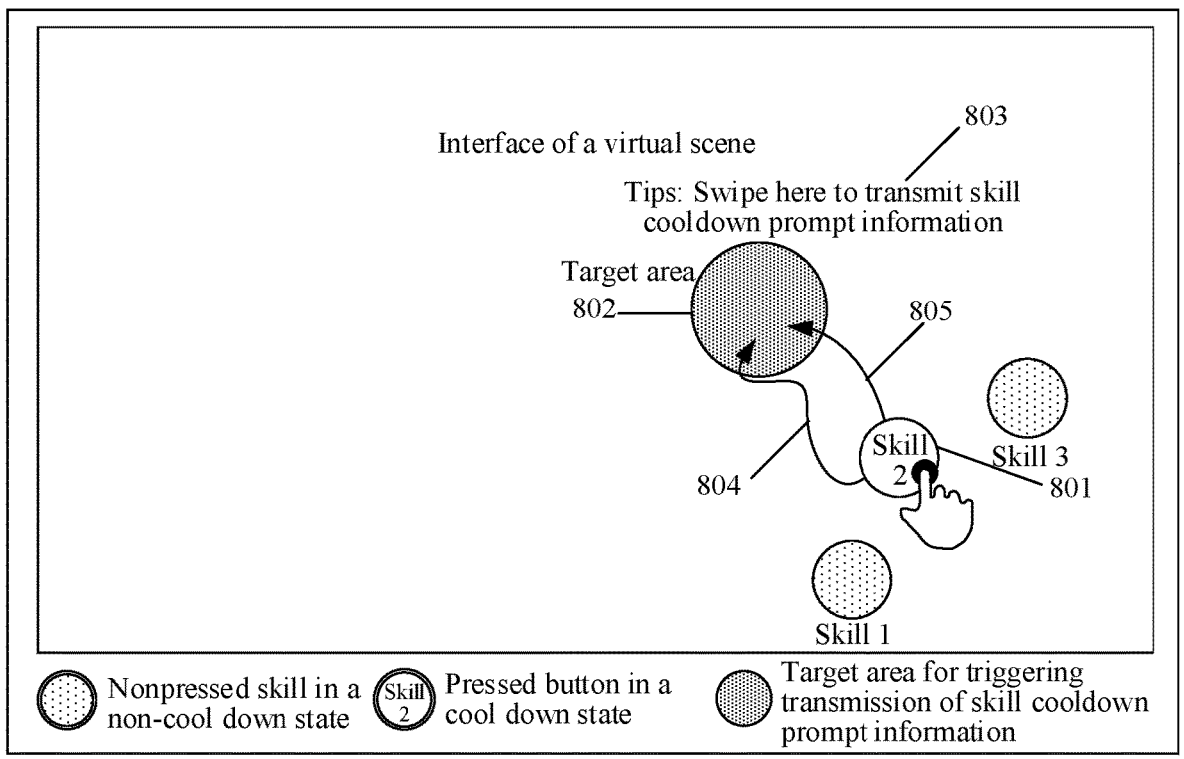
FIG. 8 is a schematic diagram of the display of a target area according to an embodiment of this application.

FIG. 8 is a schematic diagram of the display of a target area according to an embodiment of this application. When the user triggers a skill control 801 of a skill 2, a target area 802 is displayed in the display interface of the virtual scene. Tip information 803 "Tips: Swipe here to transmit skill cooldown time" is displayed in the target area 802. When the user determines, according to the tip information, to perform a swipe operation, the user may swipe a finger starting from the position of the skill control 801. In the process of swiping the finger, the finger may swipe to the target area 802 according to a swipe path indicated by a swipe trajectory 804 or a swipe trajectory 805 and is released. The terminal may receive the transmission instruction of the skill cooldown prompt information in response to the swipe operation. Accordingly, based on tip information, a player can accurately grasp a moment of swiping a skill control for the player to quickly trigger a swipe operation at the best moment to the target area from the position of a skill control, thereby improving the efficiency of transmitting skill cooldown prompt information.

In some embodiments, after the terminal displays the target area for triggering transmission of skill cooldown prompt information, the terminal may receive a corresponding swipe operation in the following manner:

displaying a swipe indication icon, the swipe indication icon being used for indicating a swipe direction from the skill control to the target area; and receiving the swipe operation starting from the skill control and swiping in the swipe direction indicated by the swipe indication icon to the target area.

After the target area is displayed, a swipe indication icon for the target area is further displayed, to indicate an optimal path of swiping from the skill control to the target area. The user swipes a finger starting from the position of the skill control to the target area according to a swipe direction indicated by the swipe indication icon, and the terminal receives the corresponding swipe operation.

Figure 9:
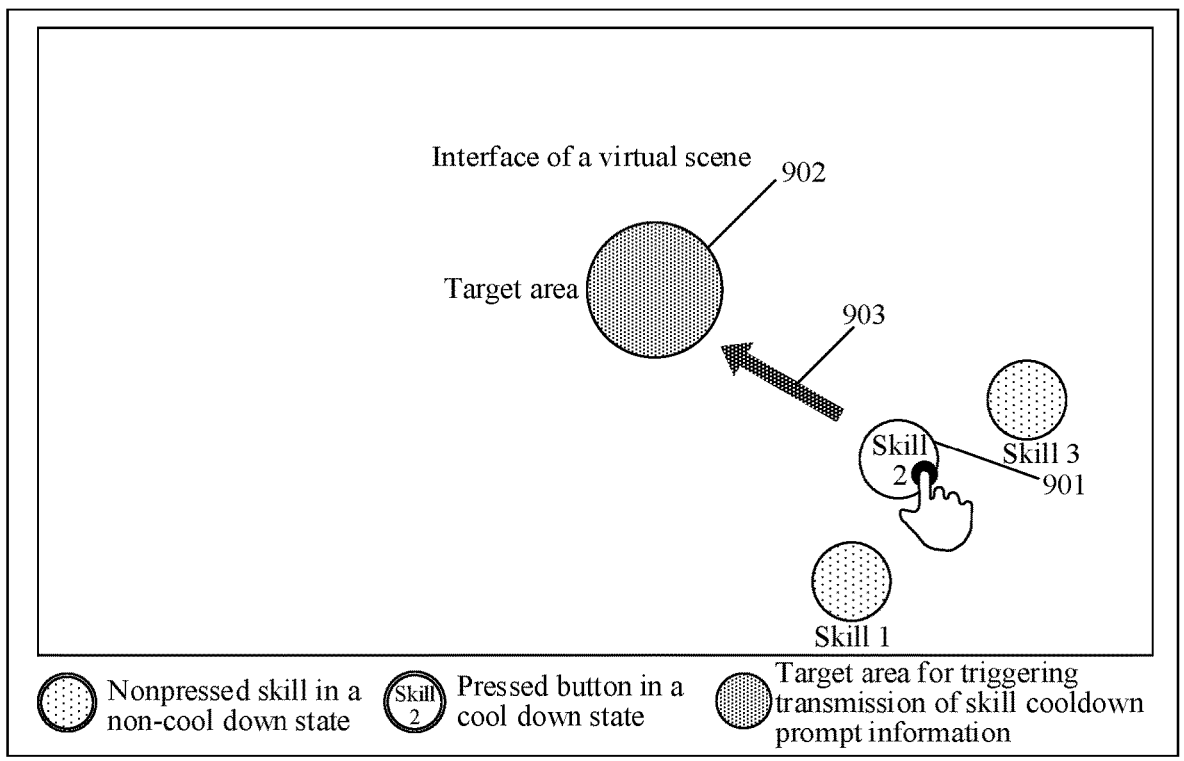
FIG. 9 is a schematic diagram of the display of a swipe indication icon according to an embodiment of this application.

FIG. 9 is a schematic diagram of the display of a swipe indication icon according to an embodiment of this application. When the user triggers a skill control 901 of a skill 2, a target area 902 is displayed in the display interface of the virtual scene, and a swipe indication icon 903 corresponding to the target area 902 is displayed. The user may swipe a finger starting from the position of the skill control 901 according to a swipe direction indicated by the swipe indication icon 903, and when the finger swipes to the target area 902 and is released, the terminal may receive the transmission instruction of the skill cooldown prompt information in response to the swipe operation. Accordingly, a player performs a swipe from the position of a skill control along an optimal path based on a swipe indication icon to quickly swipe from the skill control to the target area, thereby improving the efficiency of transmitting skill cooldown prompt information.

In some embodiments, before receiving the trigger operation for the skill control, the terminal may display the skill control of the target skill in the display interface of the virtual scene in the following manner: displaying the skill control of the target skill in the display interface of the virtual scene in a first display style; and after the terminal receives the trigger operation for the skill control, displaying the skill control in a second display style different from the first display style.

Display styles of the skill control in the display interface of the virtual scene are different before and after the trigger operation for the skill control is received. When the trigger operation is received, the triggered skill control is displayed in a second display style, and during a swipe of performing a swipe operation starting from the skill control, the skill control remains displayed in the second display style.

Figure 10:
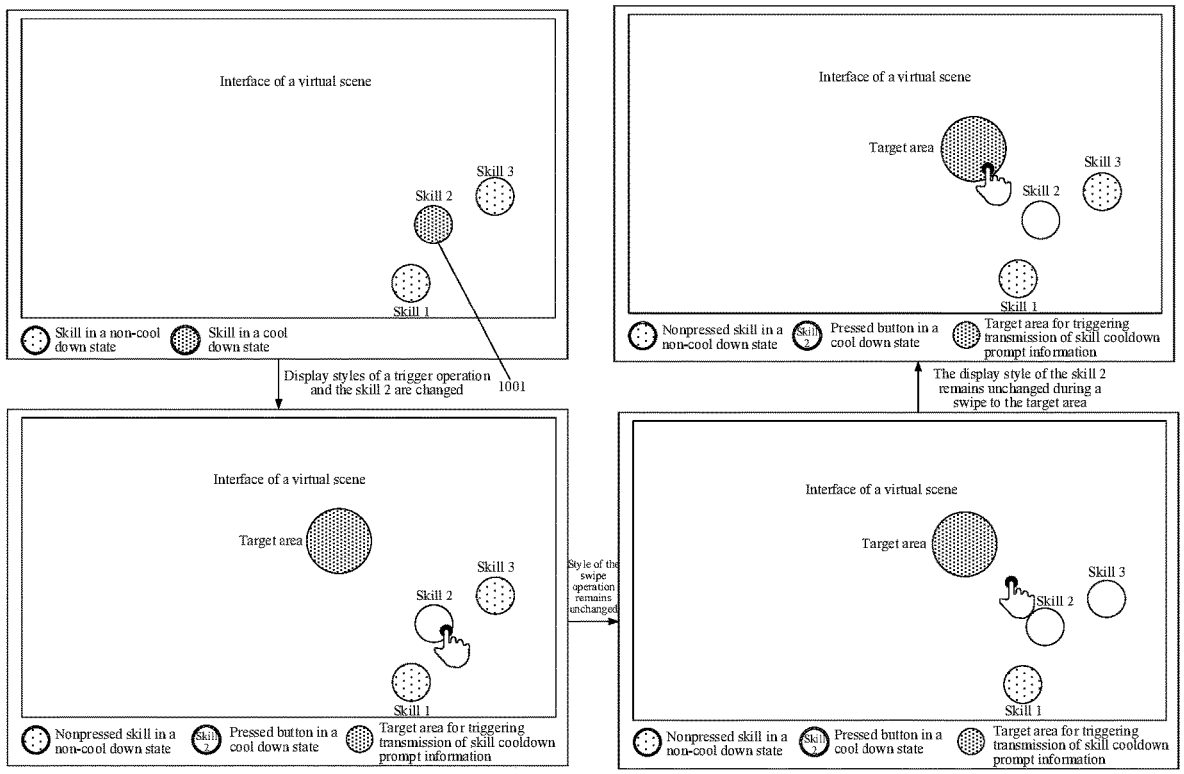
FIG. 10 is a schematic diagram of the display of a skill icon according to an embodiment of this application.

FIG. 10 is a schematic diagram of the display of a skill icon according to an embodiment of this application. Before receiving a trigger operation for a skill control 1001 of a skill 2, the skill control 1001 is displayed in a first display style. After the trigger operation for the skill control 1001 is received, the skill control 1001 is displayed in a second display style different from the first display style. During a swipe performed by the user to the target area starting from the skill control 1001, a display style of the skill control 1001 of the skill 2 remains unchanged, so that display styles of a skill control in different states are enriched, thereby improving user experience.

In some embodiments, when the swipe operation reaching the target area is released, display of the target area is canceled, and a display style of the skill control is switched from the second display style to the first display style.

When the swipe operation is released, for example, a finger swiping to the target area is released, the target area used for triggering the transmission of the skill cooldown prompt information disappears, and a triggered state of the skill control disappears. That is, the skill control is displayed in the display style before the trigger operation.

Figure 11:
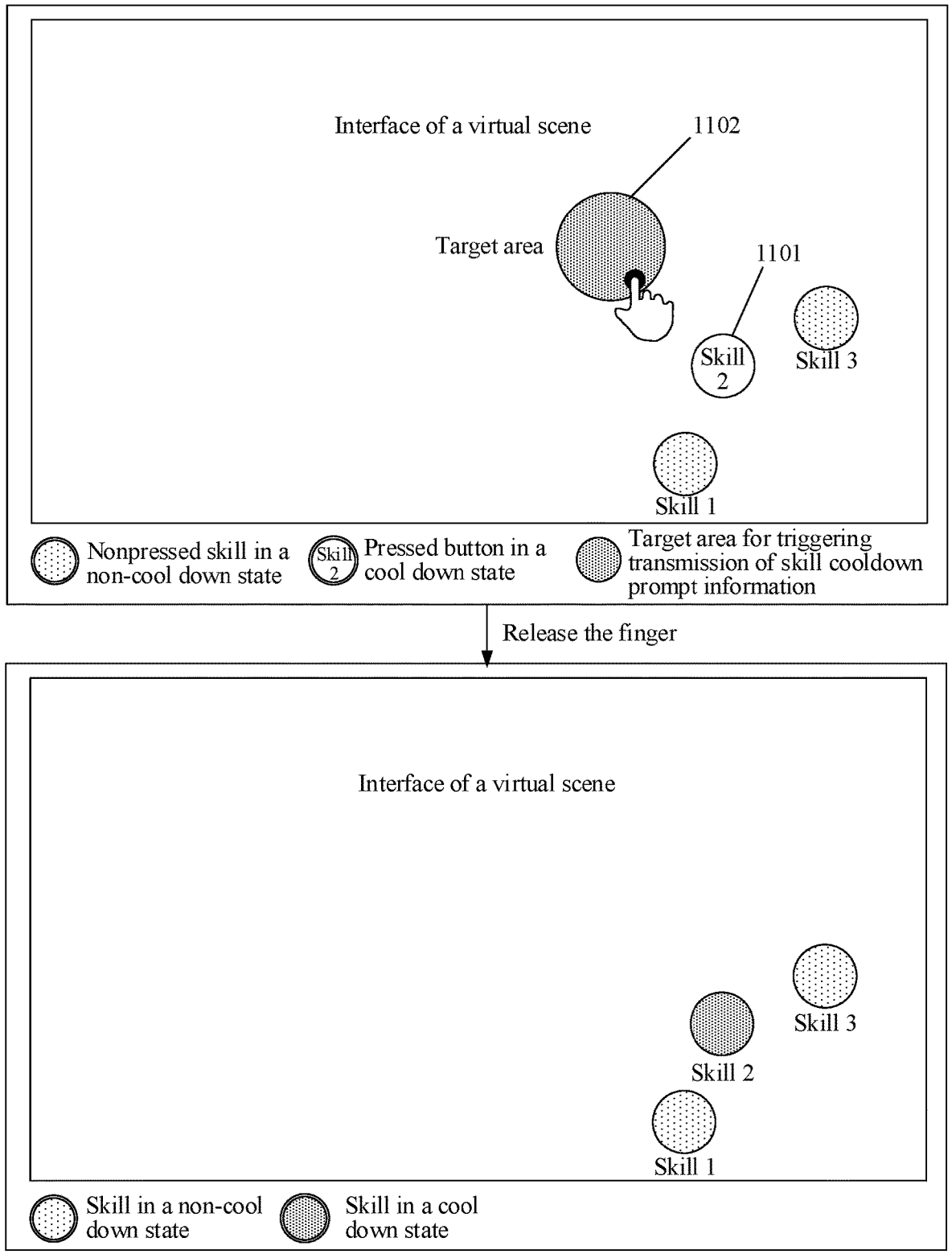
FIG. 11 is a schematic diagram of the display of a skill icon according to an embodiment of this application.

FIG. 11 is a schematic diagram of the display of a skill icon according to an embodiment of this application. When the user's finger swipes to a target area 1102 and is released (that is, a swipe operation is released), the target area 1102 disappears, and at the same time, the display style of the skill control 1101 corresponding to the skill 2 is switched to the display style of the skill control 1101 before the trigger operation.

In some embodiments, the terminal may receive the transmission instruction of the skill cooldown prompt information in the following manner:

when the skill control is in a floating state, in response to a trigger operation for the skill control, displaying a target area for triggering transmission of the skill cooldown prompt information; and in response to a drag operation for the skill control, when the skill control is dragged to the target area, receiving the transmission instruction of the skill cooldown prompt information.

The skill control may be displayed in an overlay or a floating window floating in the display interface of the virtual scene, for the user to drag the skill control. Along with the drag operation of the user, a display position of the overlay or floating window in the display interface of the virtual scene moves synchronously. That is, along with the drag operation of the user, the skill control may be dragged to another area such as a target area in the display interface of the virtual scene. When the skill control is dragged to the target area, the terminal receives the transmission instruction of the skill cooldown prompt information in response to the drag operation.

Figure 12:
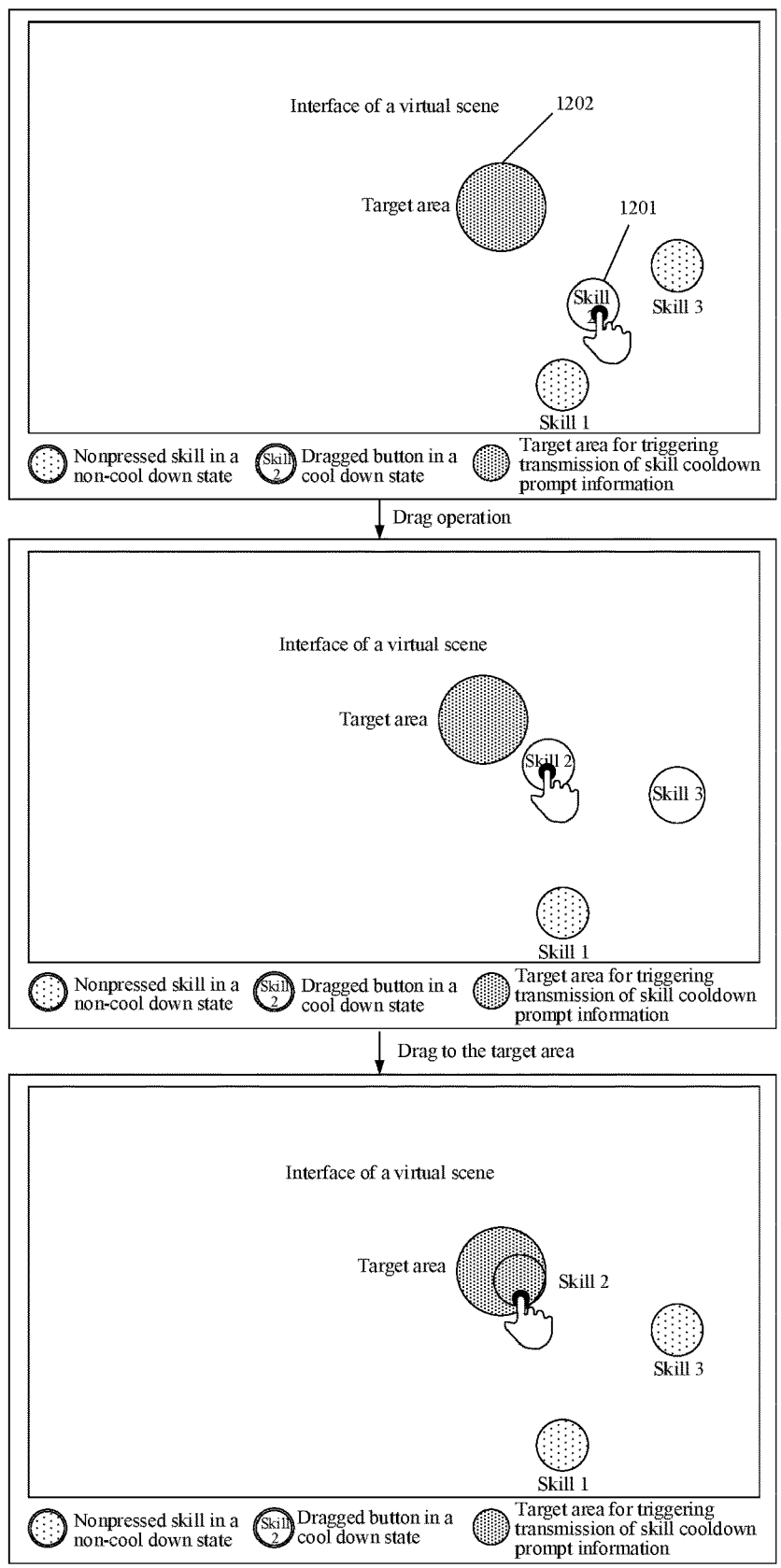
FIG. 12 is a schematic diagram of the display of a drag operation according to an embodiment of this application.

FIG. 12 is a schematic diagram of the display of a drag operation according to an embodiment of this application. A skill control 1201 of a skill 2 floats in the display interface of the virtual scene. The terminal displays a target area 1202 in the display interface of the virtual scene in response to a trigger operation for the skill control 1201 of the skill 2. Along with a drag operation of the user, the skill control 1201 may be dragged to another area in the display interface of the virtual scene. When the skill control 1201 is dragged to the target area 1202, the terminal receives the transmission instruction of the skill cooldown prompt information.

In some embodiments, the terminal may receive the transmission instruction of the skill cooldown prompt information in the following manner:

in response to a trigger operation for the skill control, displaying swipe indication information, the swipe indication information being used for indicating a target trajectory triggering transmission of the skill cooldown prompt information; and in response to a swipe operation triggered based on the display interface of the virtual scene, when a swipe trajectory of the swipe operation matches the target trajectory, receiving the transmission instruction of the skill cooldown prompt information.

The target trajectory is a trajectory that is prestored in the virtual scene and is used for triggering the transmission instruction of the skill cooldown prompt information. When the user performs a swipe operation in the display interface of the virtual scene, the terminal obtains a swipe trajectory corresponding to the swipe operation in response to the swipe operation, and matches the obtained swipe trajectory against the target trajectory. When the swipe trajectory is consistent with the target trajectory or a similarity value between the swipe trajectory and the target trajectory exceeds a similarity threshold, it is determined that the swipe operation of the user can trigger a corresponding transmission instruction.

Figure 13:
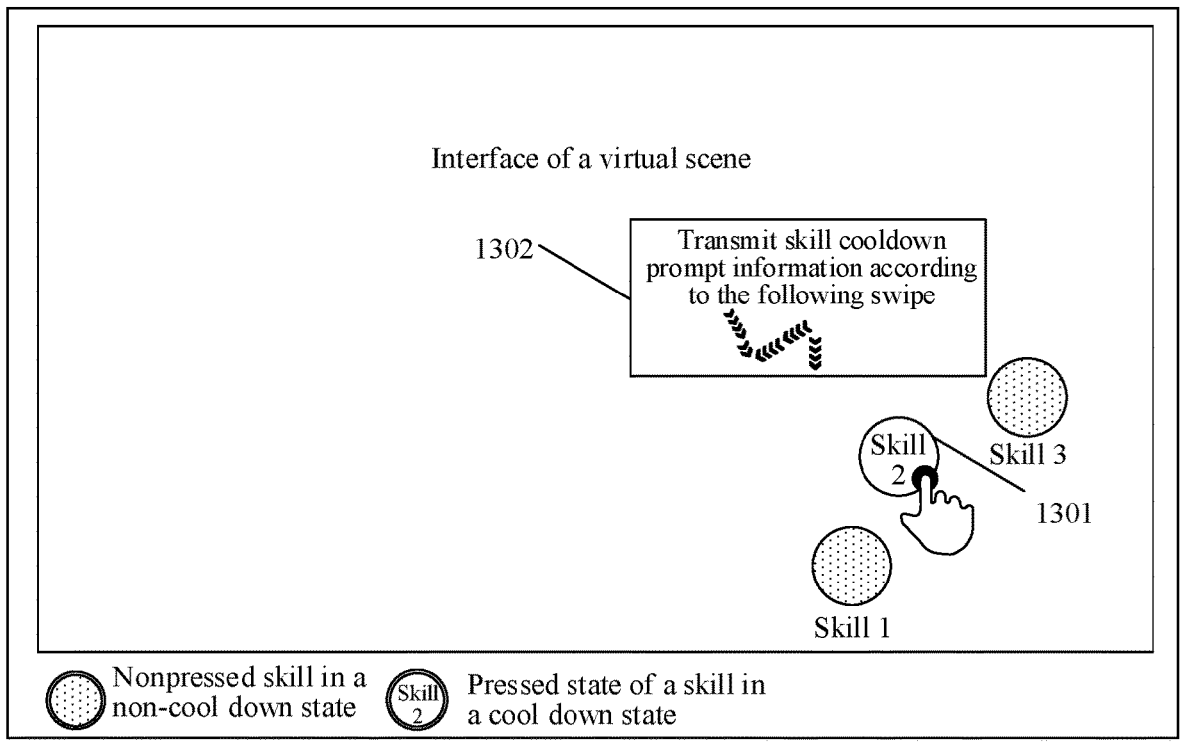
FIG. 13 is a schematic diagram of a swipe trajectory according to an embodiment of this application.

FIG. 13 is a schematic diagram of a swipe trajectory according to an embodiment of this application. When the user triggers a skill control 1301 of a skill 2, the terminal displays swipe indication information 1302 in response to the trigger operation. The user performs a swipe operation in the display interface of the virtual scene based on the swipe indication information 1302. The terminal obtains a swipe trajectory of the swipe operation in response to the swipe operation, and matches the swipe trajectory against the target trajectory. When matching succeeds, the terminal receives the triggered transmission instruction of the skill cooldown prompt information.

In some embodiments, the terminal may receive the transmission instruction of the skill cooldown prompt information in the following manner:

in response to a trigger operation for the skill control, displaying a transmission icon for transmitting the skill cooldown prompt information; and in response to a trigger operation for the transmission icon, receiving the transmission instruction of the skill cooldown prompt information; and after the terminal transmits the skill cooldown prompt information of the skill control to at least one target virtual object in the virtual scene and/or to the electronic device associated with the target virtual object, canceling display of the transmission icon in the display interface of the virtual scene.

When the user triggers a skill control, a transmission icon used for transmitting the skill cooldown prompt information is displayed. After the skill cooldown prompt information is transmitted, the transmission icon is canceled. Accordingly, the transmission icon does not reside in the display interface of the virtual scene, so that display resources can be saved.

Figure 14:
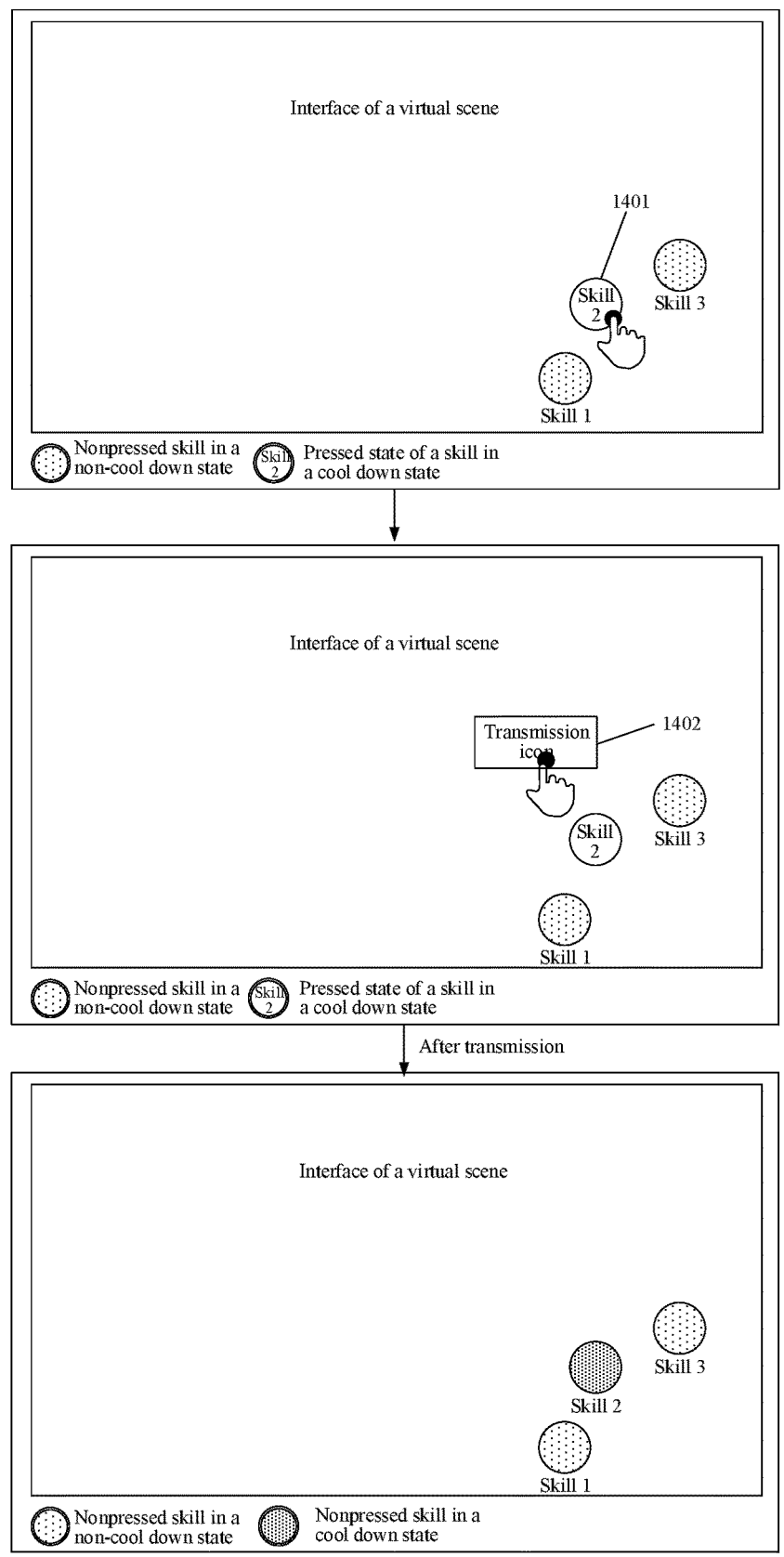
FIG. 14 is a schematic diagram of the display of a transmission icon according to an embodiment of this application.

FIG. 14 is a schematic diagram of the display of a transmission icon according to an embodiment of this application. When the user triggers a skill control 1401 of a skill 2, in response to the trigger operation, the terminal displays a transmission icon 1402 for transmitting the skill cooldown prompt information. When the user triggers the transmission icon, the terminal receives the triggered transmission instruction of the skill cooldown prompt information in response to a trigger operation for the transmission icon 1402, transmits the skill cooldown prompt information of the skill control to at least one target virtual object in the virtual scene and/or to the electronic device associated with the target virtual object, and cancels display of the transmission icon 1402.

In some embodiments, before the terminal transmits the skill cooldown prompt information of the skill control to at least one target virtual object in the virtual scene and/or to the electronic device associated with the target virtual object, the skill cooldown prompt information may be generated in the following manner:

obtaining a total cooldown time corresponding to one cooldown cycle of the skill control and a finished cooldown time of the skill control; and using a difference of subtracting the finished cooldown time from the total cooldown time as a remaining cooldown time of the skill control, and generating the skill cooldown prompt information based on the remaining cooldown time.

The total cooldown time is a cooldown time for one cooldown cycle. For example, it is assumed that the skill 2 enters a cooldown state after being cast, and 30 seconds needs to be waited before the skill can be cast again. The total cooldown time of one cooldown cycle of the skill 2 is 30 seconds. If it is obtained that the skill 2 has been cooled down for 18 seconds when the terminal receives the transmission instruction of the skill cooldown prompt information, the remaining cooldown time is 12 seconds. The skill cooldown prompt information is assembled based on the remaining cooldown time. For example, an assembly format may be: player's name: skill 2, cool down time: 12 seconds.

In some embodiments, the terminal may transmit the skill cooldown prompt information of the skill control to a terminal corresponding to the at least one target virtual object in the virtual scene in at least one of the following transmission modes: a conversation mode, an email mode, and an SMS mode.

The skill cooldown prompt information may be transmitted to terminals corresponding to all or some designated players in the virtual scene in a conversation mode, an email mode or an SMS mode, so that all or some designated players learn about cooldown progress of a target skill based on the skill cooldown prompt information, to make a combat plan according to the cooldown progress, thereby improving interaction efficiency.

Step 103: Display the skill cooldown prompt information in a prompt area in the display interface of the virtual scene, the skill cooldown prompt information being used for prompting a cooldown time of the skill control.

In some embodiments, the terminal may display the skill cooldown prompt information in the display interface of the virtual scene in the following manner: displaying the skill cooldown prompt information in a prompt area in the display interface of the virtual scene; or displaying the skill cooldown prompt information in an overlay or pop-up window form in the display interface of the virtual scene.

When the skill cooldown prompt information is transmitted in a conversation mode, corresponding skill cooldown prompt information is displayed in a prompt area (for example, a chat area) in the display interface of the virtual scene. When the skill cooldown prompt information is transmitted in an email mode or an SMS mode, the skill cooldown prompt information is displayed in an overlay or pop-up window form in the display interface of the virtual scene.

Figure 15A:
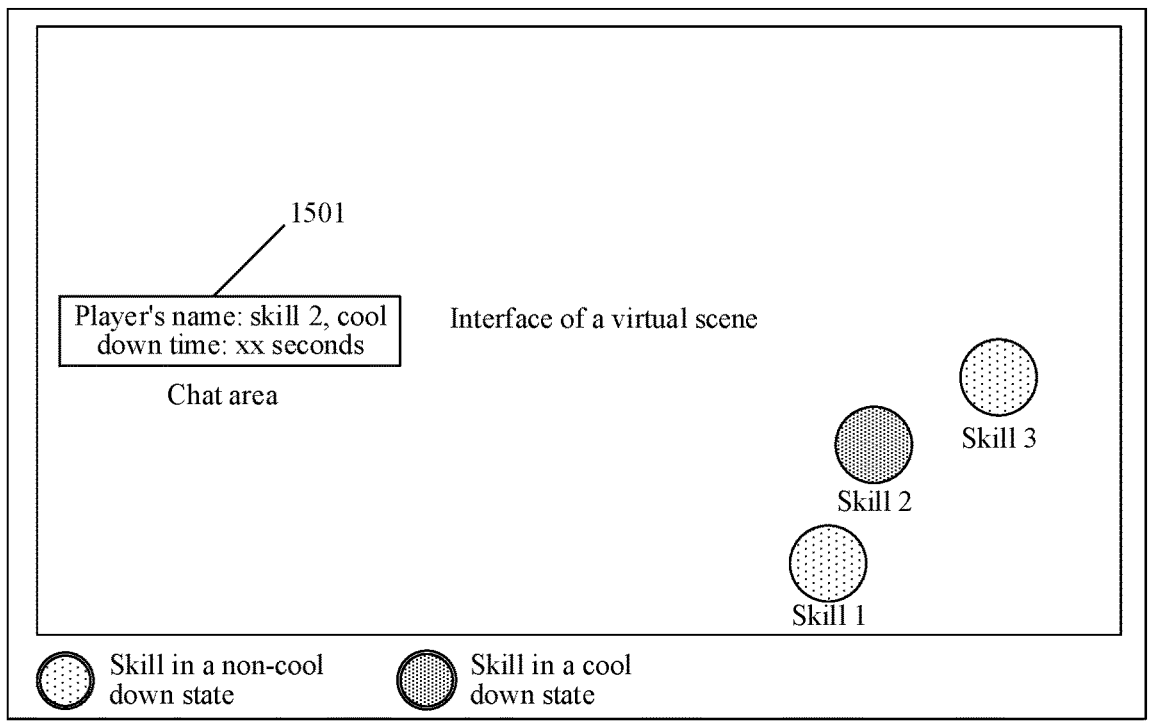
FIG. 15A and FIG. 15B are diagrams of display interfaces of prompt information according to an embodiment of this application.
Figure 15B:
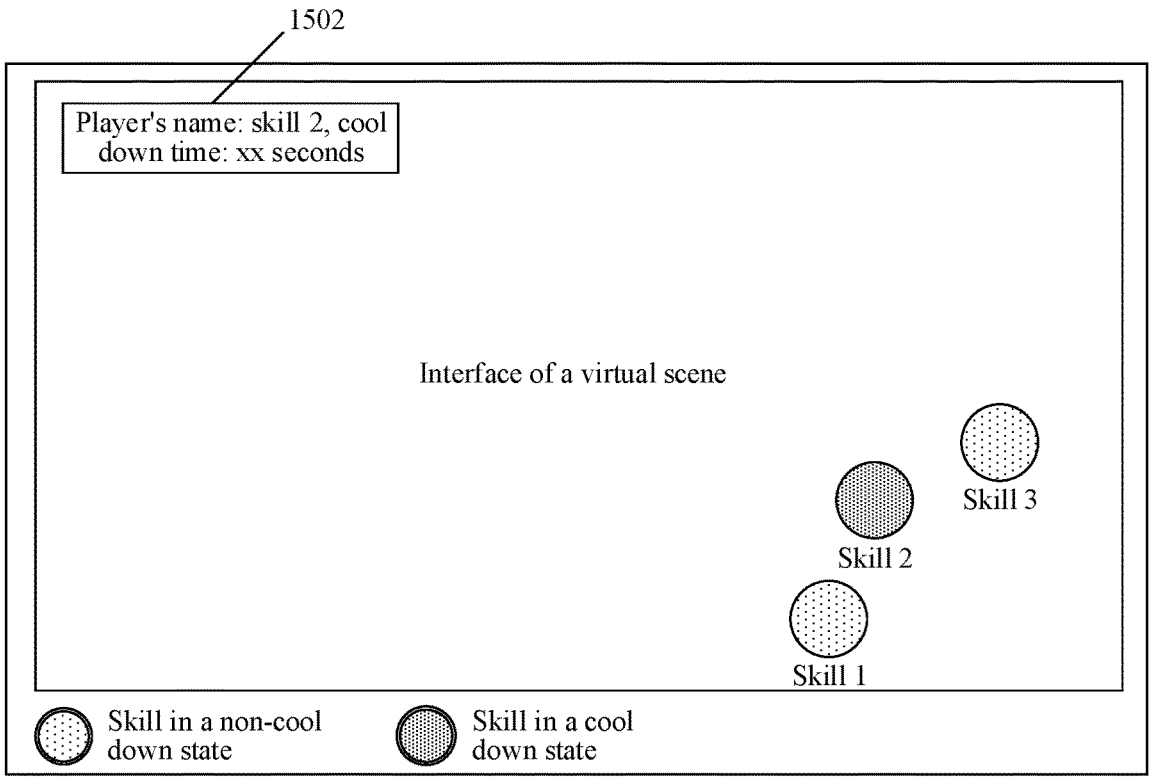

FIG. 15A and FIG. 15B are diagrams of display interfaces of prompt information according to an embodiment of this application. In FIG. 15A, skill cooldown prompt information 1501 is displayed in a chat area in the display interface of the virtual scene. In FIG. 15B, skill cooldown prompt information 1502 is displayed in an overlay or pop-up window form in the display interface of the virtual scene. A display position of the overlay or pop-up window in the display interface of the virtual scene is movable, for example, moves from a right side to a left side in the display interface of the virtual scene. Accordingly, display forms of the skill cooldown prompt information are enriched.

In the foregoing manner, a skill control of a target skill is displayed in a display interface of a virtual scene. When the skill control is in a cooldown state, in response to a transmission instruction of skill cooldown prompt information triggered based on the skill control, the terminal transmits the skill cooldown prompt information of the skill control to at least one target virtual object in the virtual scene and/or to the electronic device associated with the target virtual object, and the skill cooldown prompt information is displayed, the skill cooldown prompt information being used for prompting a cooldown time of the skill control. Accordingly, the transmission of skill cooldown prompt information can be implemented without operating a non-skill control but only based on a trigger operation of a skill control itself, to avoid invoking the non-skill control to transmit the skill cooldown prompt information every time, thereby making operations less complex. In addition, it is not necessary to add an additional non-skill control that resides in a display interface of a virtual scene, thereby improving the display simplicity of an interface, to save display resources.

An embodiments of this application in one scenario is described below.

Figure 16:
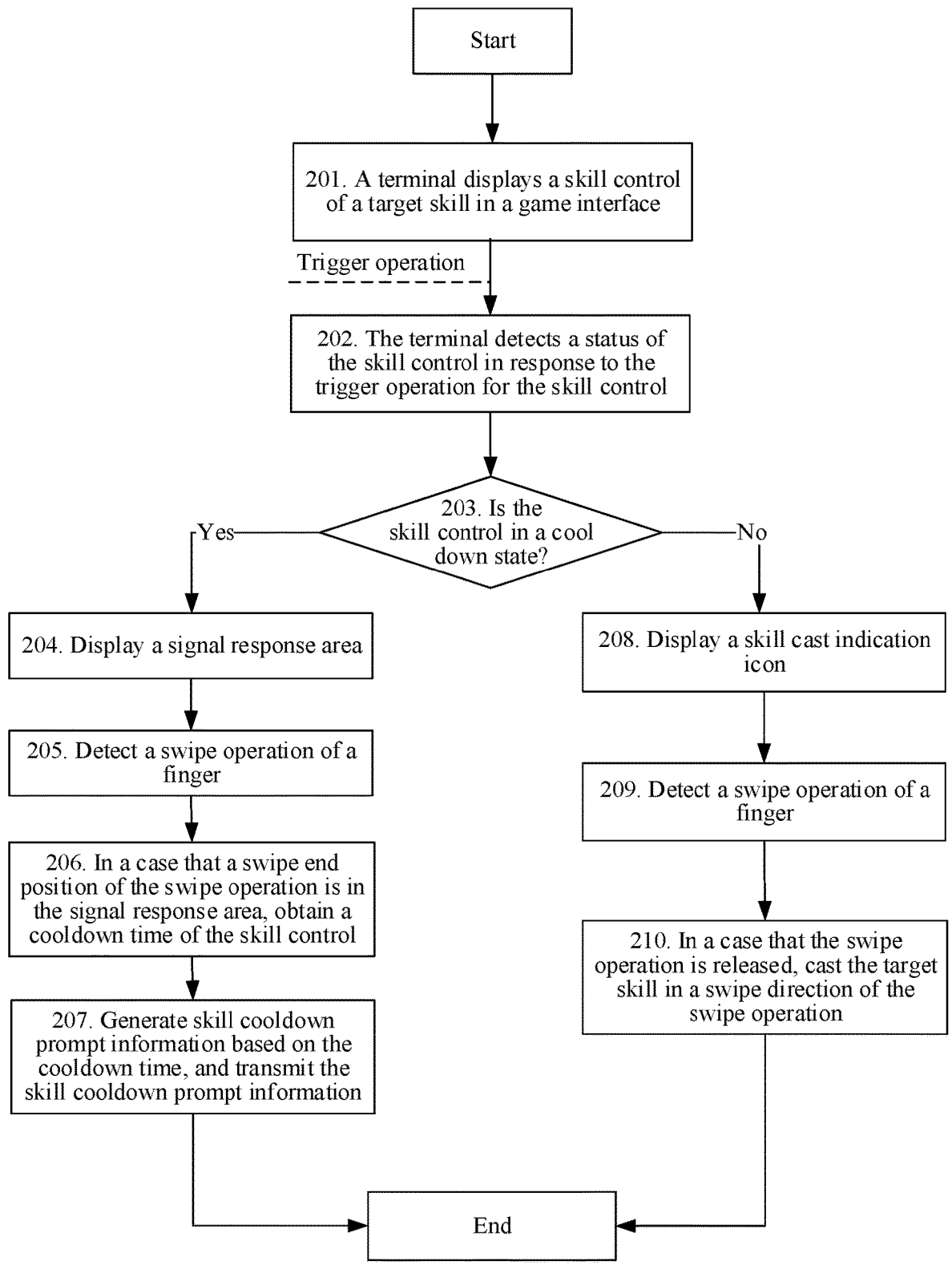
FIG. 16 is a schematic flowchart of an information processing method in a virtual scene according to an embodiment of this application.

For example, a virtual scene is a mobile terminal MOBA game. FIG. 16 is a schematic flowchart of an information processing method in a virtual scene according to an embodiment of this application. The steps shown in FIG. 16 are described.

Step 201. A terminal displays a skill control of a target skill in a game interface.

In one embodiment, a user (that is, a player) may select or possess a plurality of skills. Therefore, skill controls of the plurality of skills may be displayed in a game interface. The skill control of the target skill is only one of a plurality of skill controls.

Step 202. The terminal detects a status of the skill control in response to the trigger operation for the skill control.

The trigger operation may be a click operation or may be an operation such as a long press, a double click or a swipe. When the player triggers a skill control, the terminal detects whether the skill control is in a cooldown state.

That is, in response to a trigger operation for the skill control, the terminal obtains a trigger moment corresponding to the trigger operation, a cast moment corresponding to completion of a last cast of the target skill, and a total cooldown time corresponding to one cooldown cycle of the skill control; and obtains a time interval between the trigger moment and the cast moment, when the time interval is less than the total cooldown time, determines that the skill control is in a cooldown state, and when the time interval is greater than the total cooldown time, determines that the skill control is in a non-cooldown state.

Step 203. Determine whether the skill control in a cooldown state.

It is determined, according to a detection result, whether the skill control is in a cooldown state. When the skill control is in a cooldown state, the process turns to step 204. When the skill control is in a non-cooldown state, the process turns to step 208.

Step 204. Display a signal response area.

The signal response area is the foregoing target area and is used for triggering the transmission instruction of the skill cooldown prompt information.

Step 205. Detect a swipe operation of a finger.

Step 206. When a swipe ending position of the swipe operation is in the signal response area, obtain a cooldown time of the skill control.

When the player swipes a finger starting from a skill control, the terminal detects a swipe operation of the finger, and when the finger swipes to the signal response area and is released, the terminal obtains a cooldown time of the skill control. In this case, the cooldown time of the skill control is a time required for cooldown of the skill control to end. Generally, the cooldown time of the skill control is displayed in the display interface of the virtual scene in a style of countdown. The terminal obtains the countdown displayed in a current interface, and uses the countdown as the cooldown time of the skill control.

Step 207. Generate skill cooldown prompt information based on the cooldown time, and transmit the skill cooldown prompt information The skill cooldown prompt information is assembled based on the time required for the cooldown of the skill control to end. For example, an assembly format may be: player's name: skill 2, cool down time: xx seconds. After the skill cooldown prompt information is generated, the skill cooldown prompt information may be transmitted to some other players (for example, teammates) in a conversation mode.

Step 208. Display a skill cast indication icon.

The skill cast indication icon is used for indicating a swipe direction of swiping from the skill control.

Step 209. Detect a swipe operation of a finger.

A swipe operation of the player's finger starting from a skill icon and swiping in the swipe direction indicated by the skill cast indication icon is detected.

Step 210. When the swipe operation is released, cast the target skill in a swipe direction of the swipe operation.

In the foregoing manner, the transmission of skill cooldown prompt information can be implemented without additionally adding a residing control to a game interface but only by using an additional operation of a skill control itself, so that while the problem of transmitting a skill cooldown time during skill cooldown is resolved, the display simplicity of controls in a game interface with limited space is further improved.

Figure 17:
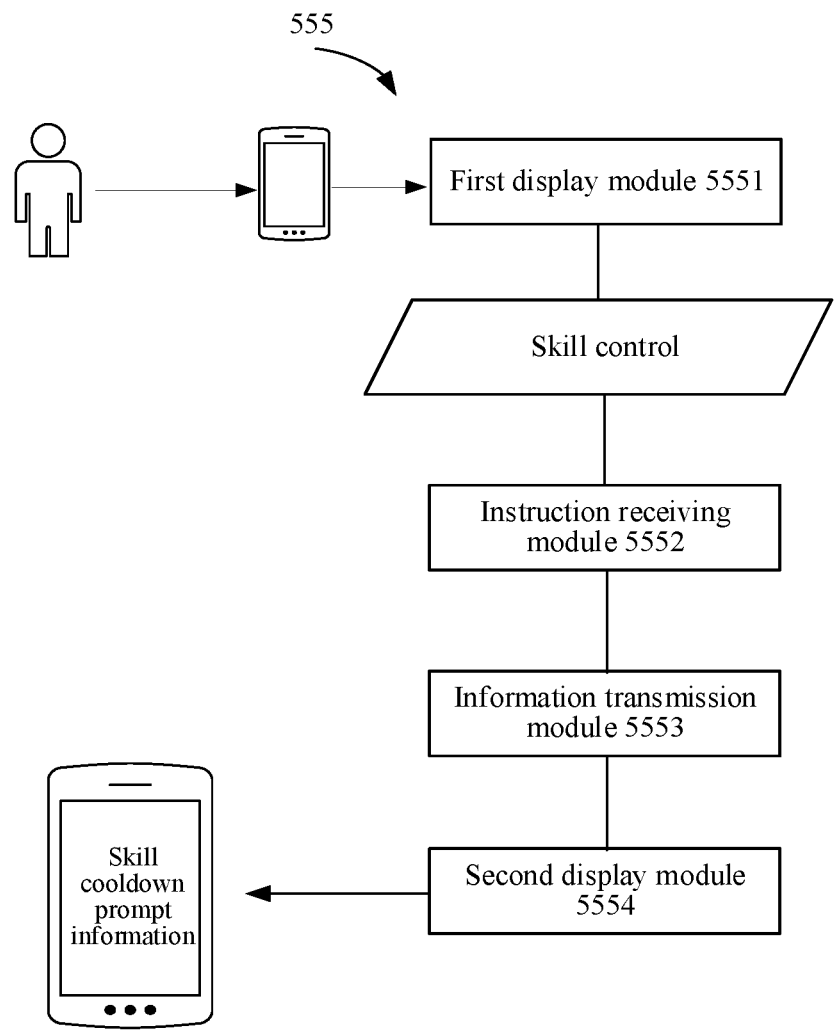
FIG. 17 is a schematic structural diagram of an information processing apparatus in a virtual scene according to an embodiment of this application.

An exemplary structure of the information processing apparatus 555 in a virtual scene provided in the embodiments of this application being implemented as a software module continues to be described below. In some embodiments, FIG. 17 is a schematic structural diagram of an information processing apparatus in a virtual scene according to an embodiment of this application. The information processing apparatus 555 in a virtual scene provided in the embodiments of this application includes:

a first display module 5551, configured to display a skill control of a target skill in a display interface of a virtual scene;

an instruction receiving module 5552, configured to: when the skill control is in a cooldown state, receive a transmission instruction of skill cooldown prompt information triggered based on the skill control;

an information transmission module 5553, configured to transmit the skill cooldown prompt information of the skill control to at least one target virtual object in the virtual scene in response to the transmission instruction; and a second display module 5554, configured to display the skill cooldown prompt information in a prompt area in the display interface of the virtual scene, the skill cooldown prompt information being used for prompting a cooldown time of the skill control.

In some embodiments, the instruction receiving module is further configured to: in response to a trigger operation for the skill control, displaying a target area for triggering transmission of the skill cooldown prompt information; and in response to a swipe operation triggered based on the skill control, when a swipe ending position of the swipe operation is in the target area, receive the transmission instruction of the skill cooldown prompt information.

In some embodiments, after the target area for triggering transmission of the skill cooldown prompt information is displayed, the apparatus further includes: a third display module, configured to display a swipe indication icon, the swipe indication icon being used for indicating a swipe direction from the skill control to the target area; and the instruction receiving module is configured to receive the swipe operation starting from the skill control and swiping in the swipe direction indicated by the swipe indication icon to the target area.

In some embodiments, the first display module is configured to display the skill control of the target skill in the display interface of the virtual scene in a first display style; and the first display module is further configured to: after the trigger operation, display the skill control in a second display style different from the first display style.

In some embodiments, the apparatus further includes a display adjustment module, configured to: when the swipe operation is released, cancel display of the target area, and switch a display style of the skill control from the second display style to the first display style.

In some embodiments, the instruction receiving module is further configured to: when the skill control is in a floating state, in response to a trigger operation for the skill control, display a target area for triggering transmission of the skill cooldown prompt information; and in response to a drag operation for the skill control, when the skill control is dragged to the target area, receive the transmission instruction of the skill cooldown prompt information.

In some embodiments, the instruction receiving module is further configured to: in response to a trigger operation for the skill control, display swipe indication information, the swipe indication information being used for indicating a target trajectory triggering transmission of the skill cooldown prompt information; and in response to a swipe operation triggered based on the display interface of the virtual scene, when a swipe trajectory of the swipe operation matches the target trajectory, receive the transmission instruction of the skill cooldown prompt information.

In some embodiments, the instruction receiving module is further configured to: in response to a trigger operation for the skill control, display a transmission icon for transmitting the skill cooldown prompt information; and in response to a trigger operation for the transmission icon, receive the transmission instruction of the skill cooldown prompt information; and after the skill cooldown prompt information of the skill control is transmitted to at least one target virtual object in the virtual scene, the apparatus further includes: a display cancellation module, configured to cancel display of the transmission icon in the display interface of the virtual scene.

In some embodiments, before the skill cooldown prompt information of the skill control is transmitted to at least one target virtual object in the virtual scene, the apparatus further includes:

a prompt information generation module, configured to: obtain a total cooldown time corresponding to one cooldown cycle of the skill control and a finished cooldown time of the skill control; and use a difference of subtracting the finished cooldown time from the total cooldown time as a remaining cooldown time of the skill control, and generate the skill cooldown prompt information based on the remaining cooldown time.

In some embodiments, the information transmission module is further configured to transmit the skill cooldown prompt information of the skill control to the at least one target virtual object in the virtual scene in at least one of the following transmission modes:

a conversation mode, an email mode, and an SMS mode.

In some embodiments, the second display module is further configured to display the skill cooldown prompt information in an overlay or pop-up window form.

In some embodiments, after the skill control of the target skill is displayed in the display interface of the virtual scene, the apparatus further includes:

a determination module, configured to: obtain a current moment of the virtual scene, a cast moment corresponding to completion of a last cast of the target skill, and a total cooldown time corresponding to one cooldown cycle of the skill control; and obtain a time interval between the current moment and the cast moment, and when the time interval is less than the total cooldown time, determine that the skill control is in a cooldown state.

The embodiments of this application provide a computer program product or a computer program. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the foregoing information processing method in a virtual scene in the embodiments of this application.

The embodiments of this application provide a computer-readable storage medium storing an executable instruction. When the executable instruction is executed by a processor, the processor is caused to perform the foregoing information processing method in a virtual scene and related functions.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

For example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

For example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. An information processing method in a virtual scene, performed by an electronic device, the method comprising:
    displaying, in a first display style, a skill control of a target skill corresponding to a virtual object controlled by the electronic device in a display interface of a virtual scene;
    when the skill control is in a cooldown state, in response to a trigger operation for the skill control, displaying a target area for triggering transmission of the skill cooldown prompt information and displaying the skill control in a second display style different from the first display style;

in response to a user operation in the target area, receiving a transmission instruction of skill cooldown prompt information triggered from the skill control, the transmission instruction being associated with a target virtual object in the virtual scene;

transmitting the skill cooldown prompt information of the skill control to the target virtual object in the virtual scene in response to the transmission instruction; displaying the skill cooldown prompt information prompting a cooldown time of the skill control; and when the user operation in the target area is stopped, canceling display of the target area, and switching a display style of the skill control from the second display style to the first display style.

2. The method according to claim 1, wherein the user operation is a swipe operation triggered on the skill control, and when a swipe ending position of the swipe operation is in the target area, the transmission instruction of the skill cooldown prompt information is received.

3. The method according to claim 2, wherein after the displaying a target area for triggering transmission of the skill cooldown prompt information, the method further comprises:

displaying a swipe indication icon, the swipe indication icon indicating a swipe direction from the skill control to the target area; and receiving the swipe operation starting from the skill control and swiping to the target area in the swipe direction according to the swipe indication icon.

4. The method according to claim 1, wherein the receiving a transmission instruction of skill cooldown prompt information triggered from the skill control comprises:

when the skill control is in a floating state, in response to the trigger operation for the skill control, displaying the target area for triggering transmission of the skill cooldown prompt information; and in response to a drag operation on the skill control, when the skill control is dragged to the target area, receiving the transmission instruction of the skill cooldown prompt information.

5. The method according to claim 1, wherein the receiving a transmission instruction of skill cooldown prompt information triggered from the skill control comprises:

in response to the trigger operation for the skill control, displaying swipe indication information, the swipe indication information indicating a target trajectory triggering transmission of the skill cooldown prompt information; and in response to a swipe operation triggered on the display interface, when a swipe trajectory of the swipe operation matches the target trajectory, receiving the transmission instruction of the skill cooldown prompt information.

6. The method according to claim 1, wherein the receiving a transmission instruction of skill cooldown prompt information triggered from the skill control comprises:

in response to the trigger operation for the skill control, displaying a transmission icon for transmitting the skill cooldown prompt information;

in response to a trigger operation for the transmission icon, receiving the transmission instruction of the skill cooldown prompt information; and canceling display of the transmission icon in the display interface after receiving the transmission instruction.

7. The method according to claim 1, wherein the method further comprises:

obtaining a total cooldown time corresponding to one cooldown cycle of the skill control and a finished cooldown time of the skill control; and determining a remaining cooldown time of the skill control, and generating the skill cooldown prompt information based on the remaining cooldown time.

8. The method according to claim 1, wherein the method further comprises:

transmitting the skill cooldown prompt information of the skill control to the at least one target virtual object in the virtual scene in one of a conversation mode, an email mode, or an SMS mode.

9. The method according to claim 1, wherein the displaying the skill cooldown prompt information comprises:

displaying the skill cooldown prompt information in an overlay or pop-up window form.

10. The method according to claim 1, wherein after the displaying a skill control of a target skill in a display interface, the method further comprises:

obtaining a current time of the virtual scene, a next cast time corresponding to completion of a last cast of the target skill, and a total cooldown time corresponding to one cooldown cycle of the skill control; and obtaining a time interval between the current time and the next cast time, and when the time interval is less than the total cooldown time, determining that the skill control is in a cooldown state.

11. An information processing apparatus in a virtual scene, comprising:

a memory, configured to store executable instructions; and a processor, configured to execute the executable instructions stored in the memory to:

display, in a first display style, a skill control of a target skill corresponding to a virtual object controlled by an electronic device in a display interface of a virtual scene;

when the skill control is in a cooldown state, in response to a trigger operation for the skill control, display a target area for triggering transmission of the skill cooldown prompt information and display the skill control in a second display style different from the first display style;

in response to a user operation in the target area, receive a transmission instruction of skill cooldown prompt information triggered from the skill control, the transmission instruction being associated with a target virtual object in the virtual scene;

transmit the skill cooldown prompt information of the skill control to the target virtual object in the virtual scene in response to the transmission instruction;

display the skill cooldown prompt information prompting a cooldown time of the skill control; and when the user operation in the target area is stopped, cancel display of the target area, and switch a display style of the skill control from the second display style to the first display style.

12. A non-transitory computer-readable storage medium, storing executable instructions, when being executed by a processor, causing the processor to perform:

displaying, in a first display style, a skill control of a target skill corresponding to a virtual object controlled by an electronic device in a display interface of a virtual scene;

when the skill control is in a cooldown state, in response to a trigger operation for the skill control, displaying a target area for triggering transmission of the skill cooldown prompt information and displaying the skill control in a second display style different from the first display style;

in response to a user operation in the target area, receiving a transmission instruction of skill cooldown prompt information triggered from the skill control, the transmission instruction being associated with a target virtual object in the virtual scene;

transmitting the skill cooldown prompt information of the skill control to the target virtual object in the virtual scene in response to the transmission instruction; displaying the skill cooldown prompt information prompting a cooldown time of the skill control; and when the user operation in the target area is stopped, canceling display of the target area. and switching a display style of the skill control from the second display style to the first display style.

13. The computer-readable storage medium according to claim 12, wherein the user operation is a swipe operation triggered on the skill control, and when a swipe ending position of the swipe operation is in the target area, the transmission instruction of the skill cooldown prompt information is received.

14. The computer-readable storage medium according to claim 13, wherein after the displaying a target area for triggering transmission of the skill cooldown prompt information, the method further comprises:

displaying a swipe indication icon, the swipe indication icon indicating a swipe direction from the skill control to the target area; and receiving the swipe operation starting from the skill control and swiping to the target area in the swipe direction according to the swipe indication icon.

15. The computer-readable storage medium according to claim 12, wherein the receiving a transmission instruction of skill cooldown prompt information triggered from the skill control comprises:

when the skill control is in a floating state, in response to the trigger operation for the skill control, displaying the target area for triggering transmission of the skill cooldown prompt information; and in response to a drag operation on the skill control, when the skill control is dragged to the target area, receiving the transmission instruction of the skill cooldown prompt information.

16. The computer-readable storage medium according to claim 12, wherein the receiving a transmission instruction of skill cooldown prompt information triggered from the skill control comprises:

in response to the trigger operation for the skill control, displaying swipe indication information, the swipe indication information indicating a target trajectory triggering transmission of the skill cooldown prompt information; and in response to a swipe operation triggered on the display interface, when a swipe trajectory of the swipe operation matches the target trajectory, receiving the transmission instruction of the skill cooldown prompt information.

* * * * *